United States Patent
Yoshida et al.

(10) Patent No.: US 10,606,570 B2
(45) Date of Patent: Mar. 31, 2020

(54) REPRESENTING SOFTWARE WITH AN ABSTRACT CODE GRAPH

(71) Applicant: FUJITSU LIMITED, Kawasaki-shi, Kanagawa (JP)

(72) Inventors: Hiroaki Yoshida, Cupertino, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 15/915,894

(22) Filed: Mar. 8, 2018

(65) Prior Publication Data

US 2019/0278572 A1    Sep. 12, 2019

(51) Int. Cl.
  *G06F 9/45*  (2006.01)
  *G06F 8/41*  (2018.01)

(52) U.S. Cl.
  CPC .................... *G06F 8/427* (2013.01)

(58) Field of Classification Search
  CPC ........................................ G06F 8/427
  USPC ........................................... 717/144
  See application file for complete search history.

(56) References Cited

U.S. PATENT DOCUMENTS

| | | | | |
|---|---|---|---|---|
| 7,117,488 B1* | 10/2006 | Franz | ..................... | G06F 21/50 717/144 |
| 2003/0056199 A1* | 3/2003 | Li | ......................... | G06F 11/323 717/127 |
| 2009/0222799 A1* | 9/2009 | Stewart | ................... | G06F 8/427 717/143 |
| 2010/0083240 A1* | 4/2010 | Siman | .................... | G06F 8/433 717/144 |
| 2016/0124723 A1* | 5/2016 | Ma | ......................... | G06F 16/00 717/144 |
| 2017/0091293 A1* | 3/2017 | Cummings | ........... | G06F 17/271 |
| 2017/0329582 A1* | 11/2017 | Steven | ..................... | G06F 8/43 |
| 2018/0113951 A1* | 4/2018 | Tanner | ................. | G06F 16/248 |
| 2018/0367557 A1* | 12/2018 | Brown | ................ | H04L 63/1425 |
| 2018/0373986 A1* | 12/2018 | Rainwater | ............. | G06N 3/084 |

OTHER PUBLICATIONS

Title: The abstract task graph: a methodology for architecture-independent programming of networked sensor systems; author: A Bakshi et al, published on 2005.*
Title: Towards portable source code representations using XML, author: E Mamas et al, published on 2000.*

(Continued)

*Primary Examiner* — Chameli Das
(74) *Attorney, Agent, or Firm* — Maschoff Brennan

(57) ABSTRACT

According to an aspect of an embodiment, a method may include generating an abstract code graph (ACG). The method may include obtaining an abstract syntax tree (AST). The AST may include a first AST node that may represent a first construct at a first level of abstraction and a second AST node that may represent a second construct. The method may further include generating an ACG, based on the AST. The generating of ACG may include generating a first ACG node based on the first AST node and a second ACG node based on the second AST node. The generating of ACG may also include generating, based on the first ACG node, a third ACG node that represents the first construct at a second level of abstraction. The third ACG node may be connected between the first ACG node and the second ACG node based on the AST.

20 Claims, 10 Drawing Sheets

(56) References Cited

OTHER PUBLICATIONS

Title: Source code files as structured documents, Ji Maletic, et al, publication on 2002.*
Title: multi-level typology of abstract visualization tasks, author: M Brehmer, et al, publication on 2013.*
J. Andersen and J. L. Lawall, "Generic Patch Inference," In Proceedings of the 2008 23rd IEEE/ACM International Conference on Automated Software Engineering (Sep. 15, 2008).
Miltiadis Allamanis and Charles Sutton, "Mining idioms from source code," In Proceedings of the 22nd ACM SIGSOFT International Symposium on Foundations of Software Engineering (Nov. 16, 2014).
Kui Liu, Dongsun Kim, Tegawendé F. Bissyandé, Shin Yoo, Yves Le Traon, "Mining Fix Patterns for FindBugs Violations," arXiv:1712.03201 [cs.SE], Dec. 8, 2017.
U.S. Appl. No. 15/822,106, filed Nov. 24, 2017.

* cited by examiner

REPRESENTING SOFTWARE WITH AN ABSTRACT CODE GRAPH

FIELD

The embodiments discussed in the present disclosure are related to representing software with an abstract code graph.

BACKGROUND

Software may be important in many industries. Software development, testing and/or debugging may benefit from tools that either aid or automate some aspects of software development, testing and/or debugging.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method of generating an abstract code graph, may be presented. The method may include obtaining an abstract syntax tree (AST) that may represent constructs of source code and relationships between the constructs in the source code. The abstract syntax tree may include a first AST node and a second AST node. The first AST node may represent a first construct as located at a first location in the source code; the first AST node may represent the first construct at a first level of abstraction. The second AST node may represent a second construct as located at a second location in the source code. The first AST node may be connected to the second AST node in the abstract syntax tree in a manner that represents a relationship between the first construct at the first location and the second construct at the second location. The method may further include generating an abstract code graph (ACG), based on the abstract syntax tree. The generating of abstract code graph may include generating a first ACG node based on the first AST node. The first ACG node may represent the first construct at the first level of abstraction. The generating of abstract code graph may also include generating a second ACG node based on the second AST node. The generating of abstract code graph may also include generating, based on the first ACG node, a third ACG node that represents the first construct at a second level of abstraction. The second level of abstraction may be more abstract than the first level of abstraction. The third ACG node may be connected between the first ACG node and the second ACG node such that the second ACG node is related to the first ACG node through the third ACG node in the abstract code graph. The relation between the first ACG node and the second ACG node may be based on the first AST node being connected to the second AST node in the abstract syntax tree.

The object and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
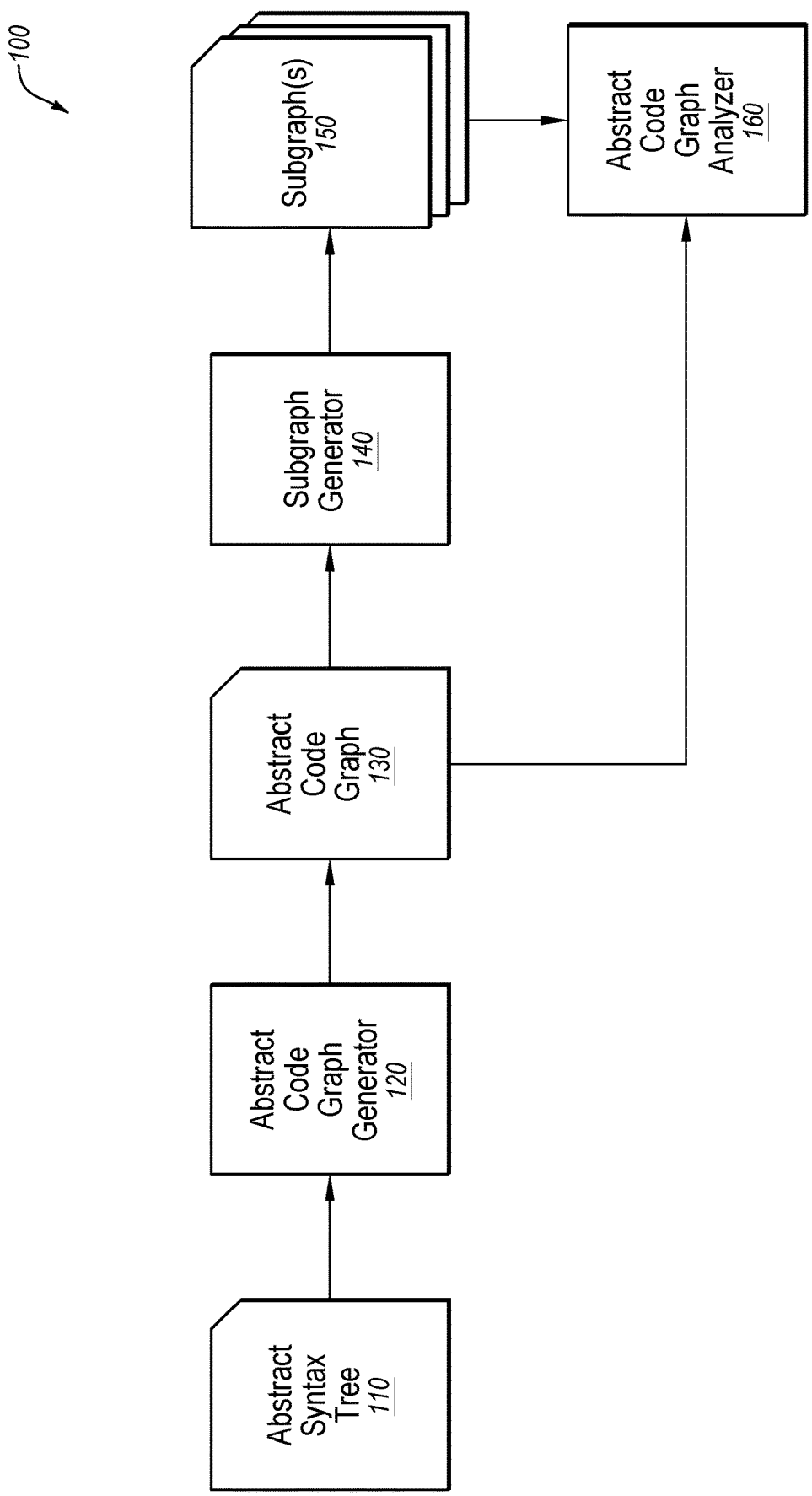
FIG. 1A is a block diagram of an example system configured to generate abstract code graphs.

Comparing two or more software programs may be beneficial to software development, debugging, and/or testing. For example, software development tools may use comparisons between two or more software programs to assist in or automate aspects of software development.

When comparing software programs it may be beneficial to compare abstract representations of source code of the software programs rather than comparing the literal source code of the software programs. Some embodiments of the present disclosure relate to generating an abstract code graph that may be an abstract representation of software programs. In the present disclosure, the term "abstracting" may refer to the process of representing source code with an abstract representation of the source code, or the process of generating the abstract representation. In the present disclosure the term "abstraction" may refer to an abstract representation.

When representing software programs with abstract representations there may be more than one way of representing the software programs. For example, software programs may be represented at multiple levels of abstraction. For instance, a highly abstract representation of a software program may represent an entire function of the software program. A less abstract representation of the software programs may include representations of lines of the source code of the software program. And an even less abstract representation of the software program may include representations of constructs of the source code of the software program. In the present disclosure the terms "abstract" and "concrete" are antonyms both referring to the level of abstraction of a representation of software programs. In the present disclosure a lowest level of abstraction, or a concrete level of abstraction, may include a literal representation without abstraction. In the present disclosure the term "abstract" may refer to a level of generalization. In the present disclosure the term "construct" may refer to elements of source code, for example, "construct" may refer to syntactic words or tokens of the source code.

For another example of representing software programs in more than one way, constructs within a syntactic phrase may be represented at different levels of abstraction. For example, in some instances, an abstraction of the line of code "closable.close( );" may be such that "closeable" may be represented by an abstraction "var;" and may be such that "close( )" may be represented literally as "close." Additionally or alternatively, another abstraction of the line of code "closable.close( );" may be such that "closable" may be represented literally and may be such that "close( )" may be represented by an abstraction "MethodCall." Thus, two, non-limiting example abstractions of "closable.close( );" may be "var.close" and "closable.MethodCall."

Abstract representations of software programs may allow for producing more meaningful results from comparisons of a particular software program with other software programs than a comparison of the literal particular software program with the other software programs. For example, in some instances it may be useful to compare abstract representations of software programs that have variable names abstracted away. For instance, a comparison of a literal line of code "closable.close( );" against another literal line of code "foo.close( );" may be returned as having no correspondence due to differences in variable names. In contrast, with the variable names abstracted away, an abstract representation of "var.close( );" and an abstract representation of "var.close( );" may have a correlation; and thus the comparison between the abstract representations may be more meaningful.

As discussed in further detail below, in some embodiments of the present disclosure, one or more abstract code graphs may be generated with respect to a particular software program. The abstract code graphs may represent the particular software program and its corresponding constructs at different levels of abstraction and may allow for performing different types of analyses of the particular software program as discussed in detail below.

For example, there may be repositories of existing software programs which may include a large number of existing software programs (e.g., thousands, tens of thousands, hundreds of thousands, millions, etc. of existing software programs). In the present disclosure, existing software programs and their corresponding source code that may be available for analysis such as in one or more repositories may be referred to as "big code." The systems or operations of the present disclosure might be used to generate abstract code graphs of big code. The abstract code graphs of big code may be analyzed to identify frequently occurring abstract code graphs, which may indicate frequently occurring code patterns in the big code. In the present disclosure, frequently occurring code patterns in the big code may be referred to as "common code patterns." For example, some common code patterns may be related to, or include faults, errors, or vulnerabilities, such as, for example, missing preconditions. Other common code patterns may be related to fixes or patches that may related to faults, errors, or vulnerabilities.

It may be beneficial to analyze software programs that are being developed, debugged, and/or tested. In the present disclosure, software programs that are being developed, debugged, and/or tested may be referred to as "software under test." It may be beneficial to compare software under test with common code patterns, such as, for example common code patterns related to faults, errors, or vulnerabilities. The systems or operations of the present disclosure may be used to generate abstract code graphs of software under test. The systems or operations of the present disclosure may be used to compare one or more abstract code graphs of software under test with one or more abstract code graphs of big code or one or more common code patterns.

Abstract code graphs of software under test and/or abstract code graphs of big code may be beneficial for software development, debugging, and/or testing. For example, software development tools may use abstract code graphs to aid software developers. For instance, an integrated development environment may analyze an abstract code graph of a software program that is being developed and prompt a developer regarding an aspect of the software program that may be indicated by the abstract code graph. Additionally or alternatively, software development tools may automate some aspects of software development, testing and/or debugging using abstract code graphs. For example, a software development tool may test software under test for bugs, errors or vulnerabilities by comparing an abstract code graph of the software under test against one or more abstract code graphs of big code. Additionally or alternatively software development tools may be involved in repairing bugs, errors or vulnerabilities in software programs. For example software development tools may identify repair candidates based on abstract code graphs, such as described in for example, U.S. patent application Ser. No. 15/822,106 filed on Nov. 24, 2017, which is incorporated herein by reference in its entirety.

FIG. 1A is a block diagram of an example system 100 configured to generate abstract code graphs 130 according to at least one embodiment described in this disclosure. The system 100 may be configured to generate an abstract code graph 130 based on an abstract syntax tree 110. Further, the system 100 may be configured to generate one or more subgraphs 150 of the abstract code graph 130 according to at least one embodiment described in this disclosure. In these or other embodiments, the system 100 may be configured to analyze one or more of the abstract code graph 130 and/or one or more subgraphs 150.

In some embodiments the abstract syntax tree 110 may include a conceptual mapping or graph that represents constructs of source code as nodes and that represents relationships between constructs as links between nodes.

Figure 1B:
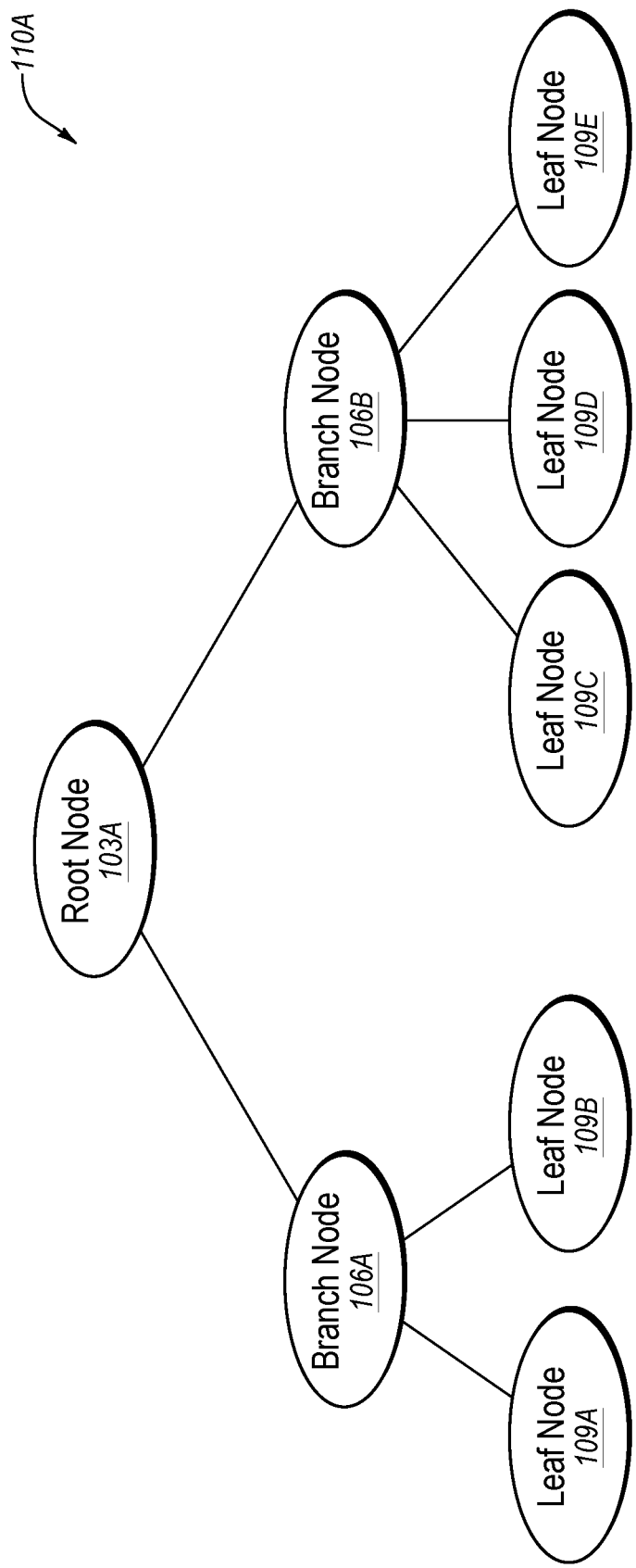
FIG. 1B is a block diagram of an example abstract syntax tree.

For example FIG. 1B illustrates an example abstract syntax tree 110A according to at least one embodiment described in this disclosure. The abstract syntax tree 110A may be an example of an abstract syntax tree 110 of FIG. 1A. Though illustrated, the abstract syntax tree 110A may be conceptual. For example the abstract syntax tree 110A may be stored in computer memory as a table, list, or other data structure.

In some embodiments the abstract syntax tree 110A may include a root node 103A, one or more branch nodes 106, and one or more leaf nodes 109. Two branch nodes are illustrated in FIG. 1B: branch node 106A, and branch node 106B, (collectively referred to as branch nodes 106 and/or individually referred to as branch node 106). Five leaf nodes are illustrated in FIG. 1B: leaf node 109A, leaf node 109B, leaf node 109C, leaf node 109D, and leaf node 109E (collectively referred to as leaf nodes 109 and/or individually referred to as leaf node 109). However, the number of branch nodes, and/or leaf nodes may vary according to different implementations.

In some embodiments the abstract syntax tree 110A may be obtained from a compiler which may generate the abstract syntax tree 110A. Additionally or alternatively the abstract syntax tree 110A may be obtained from some other source. Additionally or alternatively the system 100 may generate the abstract syntax tree 110A from source code.

In some embodiments the abstract syntax tree 110A may represent one or more syntactic phrases of source code. In some embodiments each node, such as, for example the root node 103A, the branch nodes 106, and the leaf nodes 109 may represent one construct of the source code. In some embodiments the nodes of the abstract syntax tree 110A may represent the constructs at a first level of abstraction. In some embodiments the abstract syntax tree 110A may represent the constructs at a concrete level of abstraction, or literally.

In some embodiments each node may represent one construct as found at one location of the source code. For example, a particular construct may appear twice in a syntactic phrase of the source code. An abstract syntax tree 110A that represents that syntactic phrase may include two nodes that each represent the particular construct as the particular construct was found at a different location within the syntactic phrase. In such a case, the connections between the two nodes that represent the particular construct may be different and may represent the differences in the location of the construct within the phrase.

For example, with reference to FIG. 1B, the abstract syntax tree 110A may represent the source code "if (closable !=null) closable.close( );." The root node 103A may represent the construct "if" as "IfStmt." The branch node 106A may represent the construct "!=" as "Op !=." The leaf node 109A may represent the construct "closable" at a first location in the source code as "Var closable." The leaf node 109B may represent the construct "null" as "Const null." The branch node 106B may represent the construct "close( )" as "MethodCall." The leaf node 109C may represent the construct "closable" at a second location in the source code as "Var Closable." The leaf node 109D may represent the construct "close( )" as "Id close." And the leaf node 109E may represent construct of the return of "close( )" as "Void."

In the illustrated example, both the leaf node 109A and the leaf node 109C may represent the construct "closable." With the leaf node 109A representing the construct "closable at the first location in the source code, and the leaf node 109C representing the construct "closable" at the second location in the source code. The leaf node 109A may be connected to the branch node 106A representing the relationship between the construct "closable" at the first location in the source code and the construct "!=" in the source code. The leaf node 109C may be connected to the branch node 106B representing the relationship between the construct "closable" at the second location in the source code and the construct "close( )" in the source code.

Modifications, additions, or omissions may be made to the abstract syntax tree 110A without departing from the scope of the present disclosure. Though illustrated with only one layer of branch nodes 106, the abstract syntax tree 110A may include any number of layers of branch nodes 106. In some embodiments, the abstract syntax tree 110 of FIG. 1A may be a difference abstract syntax tree, which is described in more detail with respect to FIGS. 1C and 1D.

Figure 1C:
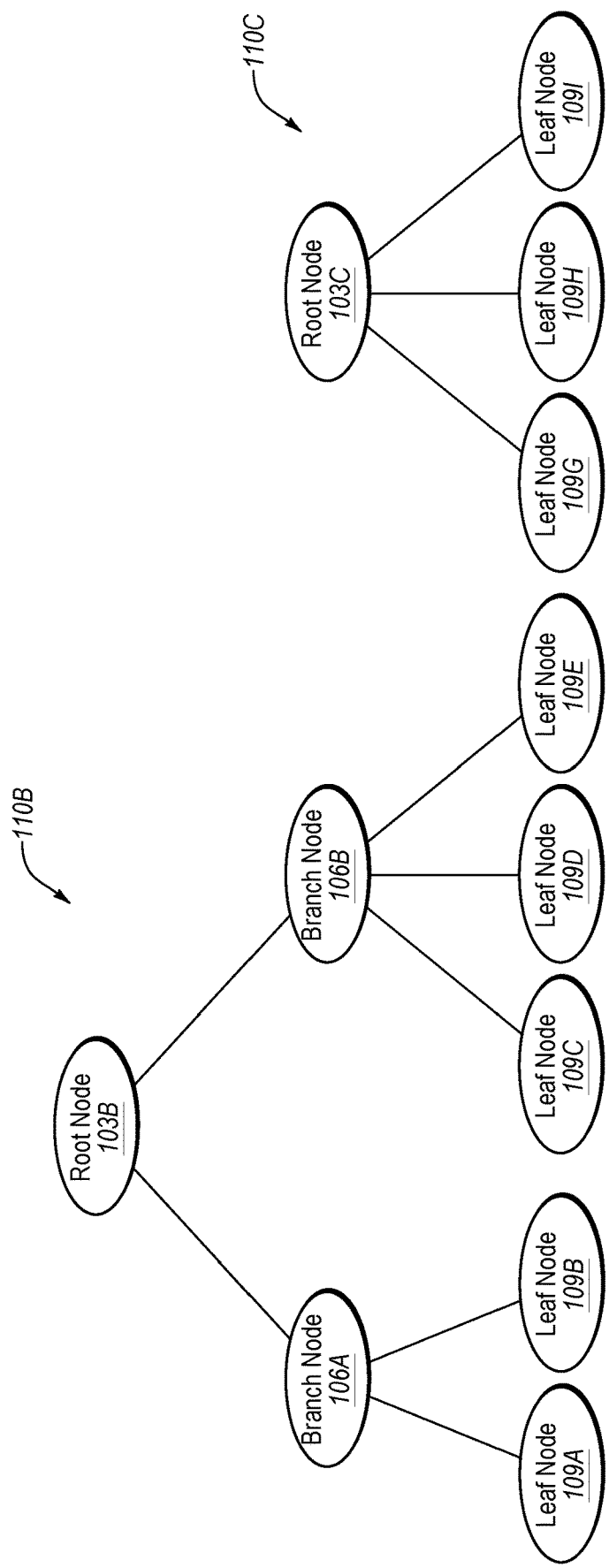
FIG. 1C is a block diagram of two example abstract syntax trees.

FIG. 1C illustrates an example abstract syntax tree 110B and an example abstract syntax tree 110C according to at least one embodiment described in this disclosure. The abstract syntax tree 110B and the abstract syntax tree 110C may each be an example of an abstract syntax tree 110 of FIG. 1A as described above. The abstract syntax tree 110B may include a representation of first constructs of first source code and relationships between the first constructs of the first source code. And the abstract syntax tree 110C may include a representation of second constructs of second source code and relationships between the second constructs of the second source code.

In some embodiments the abstract syntax tree 110B may include a root node 103B, one or more branch nodes 106, and one or more leaf nodes 109. Two branch nodes are illustrated in FIG. 1C with relation to abstract syntax tree 110B: branch node 106A, and branch node 106B, (collectively referred to as branch nodes 106 and/or individually referred to as branch node 106). Five leaf nodes are illustrated in FIG. 1C with relation to abstract syntax tree 110B: leaf node 109A, leaf node 109B, leaf node 109C, leaf node 109D, and leaf node 109E (collectively referred to as leaf nodes 109 and/or individually referred to as leaf node 109). However, the number of branch nodes, and/or leaf nodes may vary according to different implementations.

In the present disclosure, numbers of nodes, such as, for example, the leaf node 109A, may be repeated in more than one figure. This may because examples given in one figure may be continued in other figures. For example, the abstract code graph 130A of FIG. 1F may be based on the example abstract syntax tree FIG. 1B. Thus, the nodes and numbers of the FIG. 1B may correlate with the nodes and numbers of FIG. 1F. Additionally or alternatively the nodes of the figures may relate to example constructs of software, wherein the example constructs of software may continue to be described with relation to more than one figure. For example, the leaf node 109A may correspond to the construct "closable" with regard to more than one figure. For instance, the leaf node 109A may represent the construct "closable" in FIG. 1B and in FIG. 1E.

In some embodiments the abstract syntax tree 110C may include a root node 103C, one or more branch nodes 106, and one or more leaf nodes 109. Although in abstract syntax tree 110C the root node 103C acts as a branch node, the abstract syntax tree 110C may include one or more branch nodes 106. Three leaf nodes are illustrated in FIG. 1C with relation to abstract syntax tree 110C: leaf node 109G, leaf node 109H, and leaf node 109I (collectively referred to as leaf nodes 109 and/or individually referred to as leaf node 109). However, the number of branch nodes, and/or leaf nodes may vary according to different implementations.

In some embodiments the abstract syntax tree 110B may represent one or more syntactic phrases of first source code according to the explanation of the abstract syntax tree 110A above with regard to FIG. 1B. Also, the abstract syntax tree 110C may represent one or more syntactic phrases of second source code according to the explanation of the abstract syntax tree 110A above with regard to FIG. 1B. In some embodiments, the first source code and the second source code may be related, such as, for example, the first source code and the second source code may contain the same or similar constructs, perform the same or similar functions, follow the same or similar code patterns, be part of the same software program, be developed or written by the same entity, or be related to a similar fault, error or vulnerability. For example, the abstract syntax tree 110C may represent a code pattern associated with an error, and the abstract syntax tree 110B may represent a repair candidate that may address the error.

For example, the second source code may include the syntactic phrase "closable.close( );" and the first source code may include the syntactic phrase "if (closable !=null) closable.close( );." The second source code may perform the same function as the first source code. The first source code may be more secure than, or contain fewer possibilities of faults or errors than the second source code. The first source code may be a repair candidate of a development suggestion with relation to the second source code. The first source code may be from the same software program as the second source code. Additionally or alternatively the first source code may be from big code while the second source code may be from software under test.

For example, with reference to FIG. 1C, the abstract syntax tree 110C may represent the second source code "closable.close( );." The root node 103C may represent the construct "close( )" as "MethodCall." The leaf node 109G may represent the construct "closable" in the second source code as "Var Closable." The leaf node 109H may represent the construct "close( )" as "Id close." And the leaf node 109I may represent the construct of the return of "close( )" as "Void."

For example, with reference to FIG. 1C, the abstract syntax tree 110B may represent the first source code "if (closable !=null) closable.close( );." The root node 103B may represent the construct "if" as "IfStmt." The branch node 106A may represent the construct "!=" as "Op !=." The leaf node 109A may represent the construct "closable" at a first location in the first source code as "Var closable." The leaf node 109B may represent the construct "null" as "Const null." The branch node 106B may represent the construct "close( )" as "MethodCall." The leaf node 109C may represent the construct "closable" at a second location in the first source code as "Var Closable." The leaf node 109D may represent the construct "close( )" as "Id close." And the leaf node 109E may represent the construct of the return of "close( )" as "Void."

Modifications, additions, or omissions may be made to the abstract syntax tree 110B and/or the abstract syntax tree 110C without departing from the scope of the present disclosure. For example, the abstract syntax tree 110B and the abstract syntax tree 110C may include any number of branch nodes and leaf nodes. Though illustrated with only one layer of branch nodes 106, the abstract syntax tree 110B and the abstract syntax tree 110C may include any number of layers of branch nodes 106. The abstract syntax tree 110B and the abstract syntax tree 110C may be used to generate a difference abstract syntax tree, described below with regard to FIG. 1D.

Figure 1D:
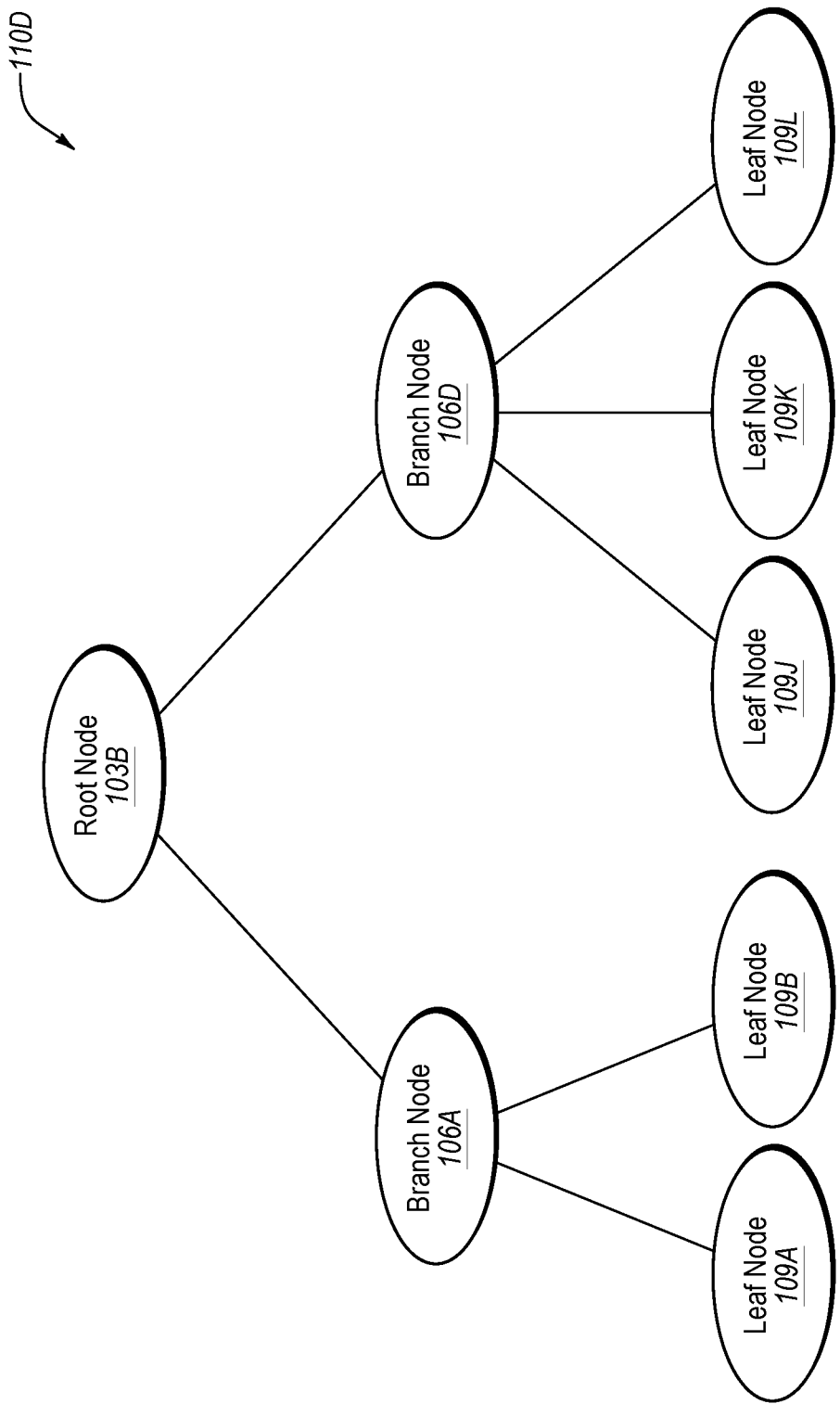
FIG. 1D is a block diagram of an example difference abstract syntax tree.

FIG. 1D illustrates an example difference abstract syntax tree 110D according to at least one embodiment described in this disclosure. The difference abstract syntax tree 110D may be an example of an abstract syntax tree 110 of FIG. 1A. The difference abstract syntax tree 110D may be an example of an abstract syntax tree 110A as described above. However, the difference abstract syntax tree 110D may include one or more representations of first constructs of first source code, relationships between the first constructs of the first source code, second constructs of second source code and relationships between the second constructs of the second source code. Additionally or alternatively, the abstract syntax tree 110D may include one or more representations of relationships between the first source code and the second source code. In these or other embodiments, the abstract syntax tree 110D may include one or more representations of relationships between the first constructs of the first source code and the second constructs of the second source code. Also, the difference abstract syntax tree 110D may include more than one root node. Additionally or alternatively the difference abstract syntax tree 110D may include an indication that one or more nodes were previously root nodes of a previous abstract syntax tree, such as, for example the abstract syntax tree 110B of FIG. 1C or the abstract syntax tree 110C of FIG. 1C.

In some embodiments the difference abstract syntax tree 110D may include one or more root nodes, one or more branch nodes 106, and one or more leaf nodes 109. Two branch nodes are illustrated in FIG. 1D with relation to difference abstract syntax tree 110D: branch node 106A, and branch node 106D, (collectively referred to as branch nodes 106 and/or individually referred to as branch node 106). Five leaf nodes are illustrated in FIG. 1D with relation to difference abstract syntax tree 110D: leaf node 109A, leaf node 109B, leaf node 109J, leaf node 109K, and leaf node 109L (collectively referred to as leaf nodes 109 and/or individually referred to as leaf node 109). However, the number of branch nodes, and/or leaf nodes may vary according to different implementations.

The difference abstract syntax tree 110D may be generated based on the abstract syntax tree 110B and the abstract syntax tree 110C of FIG. 1C. The difference abstract syntax tree 110D may be generated by a compiler, by the system 100 of FIG. 1A, or by some other suitable mechanism or operations.

The difference abstract syntax tree 110D may be generated by merging one or more nodes of the abstract syntax tree 110B of FIG. 1C with one or more nodes of the abstract syntax tree 110C of FIG. 1C. The merging may create a new node or the merging may simply include one or more nodes into an existing node. In the present disclosure, a node resulting from a merger between two or more nodes may be referred to as a "merge node." In the present disclosure, two or more nodes that merge to form a merge node may be referred to as "constituent nodes." The merge node may retain the properties of all of its constituent nodes. Because the constituent nodes may represent a construct, the merge node may also represent the construct. Because constituent nodes represent the construct the construct at a level of abstraction, the merge node may also represent the construct at the level of abstraction. The merge node may also be connected to all of the nodes to which the constituent nodes were connected.

For example, to form the difference abstract syntax tree 110D of FIG. 1D, one or more nodes of the abstract syntax tree 110B of FIG. 1C may be merged with one or more nodes of the abstract syntax tree 110C of FIG. 1C. For example, the leaf node 109C of the abstract syntax tree 110B of FIG. 1C and the leaf node 109G of the abstract syntax tree 110C of FIG. 1C may be merged to form the merge node, the leaf node 109J of FIG. 1D. The merging of the leaf node 109C and the leaf node 109G may be based on a determination that the leaf node 109C and the leaf node 109G represent the same construct in their respective source codes. The leaf node 109J may be connected to all of the nodes to which the leaf node 109C and the leaf node 109G were connected. Thus, the leaf node 109J may be connected to the branch node 106B and the root node 103C. Additionally or alternatively, because the branch node 106B may be merged with the root node 103C to form the branch node 106D, the leaf node 109J may be connected to the branch node 106D.

Similar to the example given with regard to the merging of the leaf node 109C of FIG. 1C and the leaf node 109G of FIG. 1C to form the leaf node 109J of FIG. 1D, the leaf node 109D of FIG. 1C may merge with the leaf node 109H of FIG. 1C to form the leaf node 109K of FIG. 1D, the leaf node 109E of FIG. 1C may merge with the leaf node 109I of FIG. 1C to form the leaf node 109L of FIG. 1D, and the branch node 106B of FIG. 1C may merge with the root node 103C of FIG. 1C to form the branch node 106D of FIG. 1D.

Continuing the example described above with regard to FIG. 1C, the leaf node 109C may represent the construct "closable" in the first source code as "Var closable." And the leaf node 109G may represent the construct "closable" in the second source code as "Var closable." Thus, the leaf node 109C and the leaf node 109G may be merged to form the leaf node 109J which may also represent the construct "closable" as "Var closable." Also, because the leaf node 109C was connected to branch node 106B, and the leaf node 109G was connected to root node 103C, the leaf node 109J may be connected to both branch node 106B and the root node 103C, or the merge node, the branch node 106D.

In this example, the root node 103C of FIG. 1C merged with the branch node 106B of FIG. 1C to form the branch node 106D of FIG. 1D. The root node of the first source code (root node 103B) and the root node of the second source code (root node 103C) may retain an indication that they were root nodes. Thus, the branch node 106D may include an indication that it was a root node of the second source code. Additionally or alternatively, a difference abstract syntax tree 110D may include two or more root nodes.

Modifications, additions, or omissions may be made to the difference abstract syntax tree 110D without departing from the scope of the present disclosure. For example, the difference abstract syntax tree 110D may include any number of branch nodes and leaf nodes. Though illustrated with only one layer of branch nodes 106, the difference abstract syntax tree 110D may include any number of layers of branch nodes 106. Though illustrated as being based on two abstract syntax trees, a difference abstract syntax tree 110D may be based on any number of abstract syntax trees. Additionally or alternatively a difference abstract syntax tree 110D may be based on any number of source codes.

Returning now to FIG. 1A, in some embodiments the system 100 may include the abstract code graph generator 120, which may be configured to generate the abstract code graph 130 based on the abstract syntax tree 110. In some embodiments the abstract code graph generator 120 may be configured to generate one or more abstract nodes for each node in the abstract syntax tree 110. In these or other embodiments, the abstract code graph generator 120 may be configured to merge one or more nodes of the abstract syntax tree 110 and/or the generated nodes into nodes of the abstract code graph 130. In some embodiments, the abstract code graph generator 120 may be configured to generate the abstract nodes and perform the merging in any order or at substantially the same time or the same time.

In some embodiments the abstract code graph generator 120 may include code and routines configured to enable a computing system to perform one or more operations to generate an abstract code graph. Additionally or alternatively, the abstract code graph generator 120 may be implemented using hardware including a processor, a microprocessor (e.g., to perform or control performance of one or more operations), a field-programmable gate array (FPGA), or an application-specific integrated circuit (ASIC). In some other instances, the abstract code graph generator 120 may be implemented using a combination of hardware and software. In the present disclosure, operations described as being performed by the abstract code graph generator 120 may include operations that the abstract code graph generator 120 may direct a system to perform.

Modifications, additions, or omissions may be made to the abstract code graph generator 120 without departing from the scope of the present disclosure. For example, in some embodiments the abstract code graph generator 120 may be configured to obtain the abstract syntax tree 110 by generating the abstract syntax tree 110 from source code. For another example the abstract code graph generator 120 may generate the abstract code graph 130 from source code without first obtaining the abstract syntax tree 110. In these or other embodiments, the abstract syntax tree 110 may have been previously generated and a representation thereof may be obtained by the abstract code graph generator 120. In some embodiments, the abstract syntax tree 110 may be a difference abstract syntax tree as described with regard to FIG. 1D. For another example, the abstract code graph generator 120 may not merge any nodes. Further, the order of operations may vary according to different implementations. An illustration of operations that may be used by the abstract code graph generator 120 to generate the abstract code graph 130 is described with relation to generation of an example abstract code graph 130A of FIG. 1F based on the abstract syntax tree 110A of FIG. 1B by way of an intermediate abstract code graph 125A of FIG. 1E.

Figure 1E:
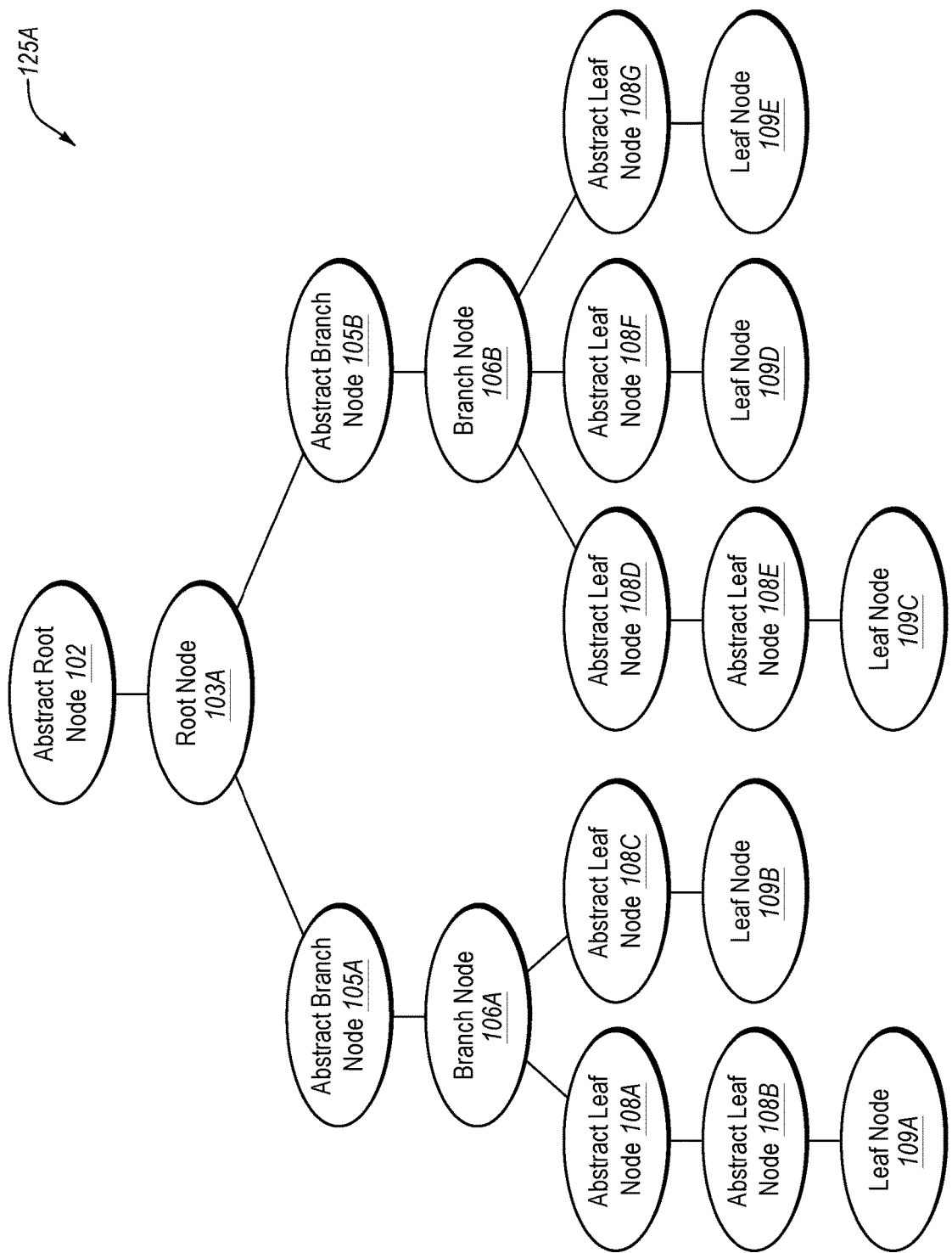
FIG. 1E is a block diagram of an example intermediate abstract code graph.

For example, FIG. 1E illustrates an example intermediate abstract code graph 125A according to at least one embodiment described in this disclosure. With respect to at least some embodiments, the intermediate abstract code graph 125A may merely help in understanding how the abstract code graph generator 120 may arrive at generating the abstract code graph 130. In general the intermediate abstract code graph 125A may represent source code including representing the source code at one or more levels of abstraction. Though illustrated, the abstract intermediate abstract code graph 125A may be conceptual.

In some embodiments the intermediate abstract code graph 125A may include an abstract root node 102, a root node 103A, one or more abstract branch nodes 105, one or more branch nodes 106, one or more abstract leaf nodes 108, and one or more leaf nodes 109. Two abstract branch nodes are illustrated in FIG. 1E: abstract branch node 105A, and abstract branch node 105B, (collectively referred to as abstract branch nodes 105 and/or individually referred to as abstract branch node 105). Two branch nodes are illustrated in FIG. 1E: branch node 106A, and branch node 106B, (collectively referred to as branch nodes 106 and/or individually referred to as branch node 106). Seven abstract leaf nodes are illustrated in FIG. 1E: abstract leaf node 108A, abstract leaf node 108B, abstract leaf node 108C, abstract leaf node 108D, abstract leaf node 108E, abstract leaf node 108F, and abstract leaf node 108G (collectively referred to as abstract leaf nodes 108 and/or individually referred to as abstract leaf node 108). Five leaf nodes are illustrated in FIG. 1E: leaf node 109A, leaf node 109B, leaf node 109C, leaf node 109D, and leaf node 109E (collectively referred to as leaf nodes 109 and/or individually referred to as leaf node 109). However, the number of abstract branch nodes, branch nodes, abstract leaf nodes and/or leaf nodes may vary according to different implementations.

Figure 1F:
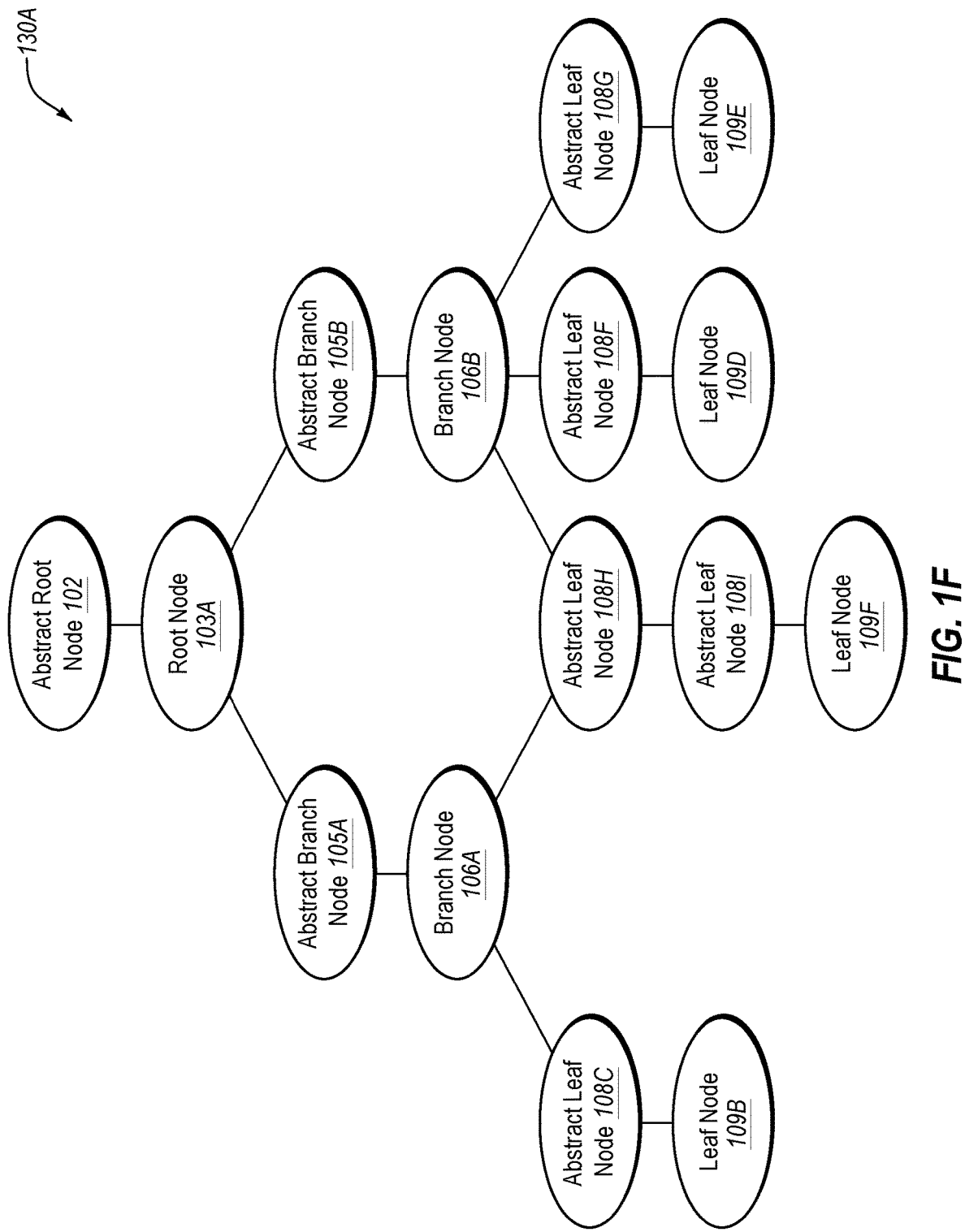
FIG. 1F is a block diagram of an example abstract code graph.

For illustration purposes the intermediate abstract code graph 125A may be generated by the abstract code graph generator 120 of FIG. 1A as an intermediate step in generating the abstract code graph 130A of FIG. 1F. The intermediate abstract code graph 125A may be generated by generating one or more abstract nodes for each node in the abstract syntax tree 110A of FIG. 1B. In some embodiments the abstract code graph generator 120 may abstract each node of the abstract syntax tree 110A according to any suitable operations of performing software abstraction. Abstraction may be performed according to one or more rules which may correspond to the construct to be abstracted. In these or other embodiments, the rules may correspond to a category or a classification of the construct to be abstracted, for example "variable," "operation," or "MethodCall". For instance, at the lowest level of abstraction, a variable may be represented by a type and a name of the variable, for instance "Var closable" or "Name closable." At a higher level of abstraction the variable may be represented by the type, but not the name, for instance "Type File." At a yet higher level of abstraction the variable may be represented by "Var" or "variable" without the type or the name. In the present disclosure nodes generated as an abstraction based on other nodes may be referred to as "abstract nodes."

For example, the abstract code graph generator 120 may generate abstract leaf node 108C which may be an abstract representation of the construct of leaf node 109B. And, abstract leaf node 108A and abstract leaf node 108B may both be an abstract representations of the construct of leaf node leaf node 109A. In some embodiments the abstract leaf node 108A may be more abstract than abstract leaf node 108B.

Continuing the example described above with regard to FIG. 1B, the intermediate abstract code graph 125A may represent the source code "if (closable !=null) closable.close( );." The abstract root node 102 may represent the construct "if" as "StmtList," which may be more abstract than the root node 103A representation of "IfStmt." The abstract branch node 105A may represent the construct "!=" as "Expr," which may be more abstract than the branch node 106A representation of "Op !=." The leaf node 109A may represent the construct "closable" at the first location in the source code as "Name closable" which may be the same level of abstraction as the representation of "Var closable" of the abstract syntax tree 110A of FIG. 1B. The abstract leaf node 108B may represent the construct "closable" at the first location in the source code as "Type File," which may be more abstract than the leaf node 109A representation of "Name closable." The abstract leaf node 108A may represent the construct "closable" at the first location in the source code as "Var," which may be more abstract than the leaf node 109A representation of "Name closable," and the abstract leaf node 108B representation of "Type File." The abstract leaf node 109C may represent the construct "null" as "Const" which may be more abstract than the leaf node 109B representation of "Const null." The abstract branch node 105B may represent the construct "close( )" as "StmtList," which may be more abstract than the branch node 106B representation of "MethodCall." The leaf node 109C may represent the construct "closable" at the second location in the source code as "Name closable" which may be the same level of abstraction as the representation of "Var closable" of the abstract syntax tree 110A of FIG. 1B. The abstract leaf node 108E may represent the construct "closable" at the second location in the source code as "Type File," which may be more abstract than the leaf node 109C representation of "Name closable." The abstract leaf node 108D may represent the construct "closable" at the second location in the source code as "Var," which may be more abstract than the leaf node 109C representation of "Name closable," and the abstract leaf node 108E representation of "Type File." The abstract leaf node 109F may represent the construct "close( )" as "Id," which may be more abstract than the leaf node 109D representation of "Id close." And the abstract leaf node 109G may represent construct of the return of "close( )," "Void," as "ExprList," which may be more abstract than the representation of leaf node 109E of "Void."

To generate the abstract code graph 130A, as described below with regard to FIG. 1F from the intermediate abstract code graph 125A, the abstract code graph generator 120 may merge nodes that represent the same construct at the same level of abstraction. The merging may occur in substantially the same way as the merging described above with regard to FIG. 1D. However, in this case there may be an additional determination that the two constituent nodes represent the same construct at the same level of abstraction, or in the same way.

For example, returning again to the example described above with regard to FIG. 1B, each of the leaf node 109A, the leaf node 109C, the abstract leaf node 108A, the abstract leaf node 108B, the abstract leaf node 108D, and the abstract leaf node 108E represent the same construct "closable." In these or other embodiments, the leaf node 109A may be merged with the leaf node 109C because the leaf node 109A and 109C represent "closeable" at the same level of abstraction. Additionally or alternatively, the leaf nodes 109A and 109C may not be merged with the abstract leaf nodes 108 that represent "closable" at other levels of abstraction. Similarly, in these or other embodiments the abstract leaf node 108B may be merged with the abstract leaf node 108E because the abstract leaf node 108B and the abstract leaf nodes 108E represent the construct "closable" at the same level of abstraction, in this case as "Type File." Similarly, in these or other embodiments the abstract leaf node 108A may be merged with the abstract leaf node 108D because the abstract leaf node 108A and the abstract leaf nodes 108D represent the construct "closable" at the same level of abstraction, in this case as "Var." Additionally or alternatively the abstract leaf node 108B may not be merged with the abstract leaf node 108A or the abstract leaf node 108D because the abstract leaf node 108B represents the construct "closable" at a different level of abstraction than the abstract leaf node 108A and the abstract leaf node 108D.

Modifications, additions, or omissions may be made to the intermediate abstract code graph 125A without departing from the scope of the present disclosure. For example, though illustrated with only one layer of branch nodes 106, the intermediate abstract code graph 125A may include any number of layers of branch nodes 106. For another example, not all of the nodes of the abstract syntax tree 110A may be the basis for the generation of abstract nodes. In these or other embodiments one or more nodes of the abstract syntax tree 110A may not have any abstract nodes generated based on the one or more nodes of the abstract syntax tree 110A. The intermediate abstract code graph 125A may be used to generate the abstract code graph 130A, such as, for example the abstract code graph described with regard to FIG. 1F.

FIG. 1F illustrates an example abstract code graph 130A according to at least one embodiment described in this disclosure. The abstract code graph 130A may be an example of an abstract code graph 130 of FIG. 1A. In general the abstract code graph 130A may include a representation of constructs of source code and relationships between constructs of the source code. Compared with an abstract syntax tree the difference abstract code graph 130A may additionally or alternatively include abstract nodes and merge nodes. Though illustrated, the abstract code graph 130A may be conceptual. For example the abstract code graph 130A may be stored in computer memory as a table, list, or other data structure.

In some embodiments the abstract code graph 130A may include an abstract root node 102, a root node 103A, one or more abstract branch nodes 105, one or more branch nodes 106, one or more abstract leaf nodes 108, and one or more leaf nodes 109. Two abstract branch nodes are illustrated in FIG. 1F: abstract branch node 105A, and abstract branch node 105B, (collectively referred to as abstract branch nodes 105 and/or individually referred to as abstract branch node 105). Two branch nodes are illustrated in FIG. 1F: branch node 106A, and branch node 106B, (collectively referred to as branch nodes 106 and/or individually referred to as branch node 106). Five abstract leaf nodes are illustrated in FIG. 1F. Of the five abstract leaf nodes illustrated in FIG. 1F, three were illustrated earlier with regard to FIG. 1C: abstract leaf node 108C, abstract leaf node 108F, and abstract leaf node 108G. Two abstract leaf nodes are newly added, abstract leaf node 108H, and abstract leaf node 108I. Collectively the abstract leaf nodes are referred to as abstract leaf nodes 108 and/or individually referred to as abstract leaf node 108. Four leaf nodes are illustrated in FIG. 1F. Of the Four leaf nodes illustrated in FIG. 1F, three were illustrated earlier with regard to FIG. 1C: leaf node 109B, leaf node 109D, and leaf node 109E. One leaf node is newly added, leaf node 109F. Collectively the leaf nodes are referred to as leaf nodes 109 and/or individually referred to as leaf node 109. However, the number of abstract branch nodes, branch nodes, abstract leaf nodes and/or leaf nodes may vary according to different implementations.

In some embodiments the abstract code graph 130A may include a conceptual mapping or graph representing constructs of source code as nodes, and relationships between constructs as connections between nodes. In some embodiments the abstract code graph 130A may represent one or more syntactic phrases of source code. In some embodiments each node, such as, for example the root node 103A, the branch nodes 106, and the leaf nodes 109 may represent one construct of the source code. In some embodiments the abstract code graph 130A may include one or more nodes from the abstract syntax tree 110A. In some embodiments each of the root node 103A, the branch nodes 106, and the leaf nodes 109 may be directly related to, or the same as, nodes found in the abstract syntax tree 110A.

Further, some nodes of the abstract code graph 130A may include abstract nodes, which may represent the constructs of the source code at a higher level of abstraction than the level of abstraction at which the nodes of the abstract syntax tree 110A represented the constructs of the source code. For example, the abstract leaf nodes 108 may represent the constructs of the source code at a higher level of abstraction than the level of abstraction with which the leaf nodes 109 of FIG. 1B or of FIG. 1F represent the constructs. For another example, the abstract branch nodes 105 may represent the constructs of the source code at a higher level of abstraction than the level of abstraction with which the branch nodes 106 of FIG. 1B or of FIG. 1F represent the constructs.

Because the abstract code graph 130A may include nodes which may be directly related to, or the same as, nodes in the abstract syntax tree 110A (such as, for example the root node root node 103A, the branch nodes 106, and the leaf nodes 109), the abstract code graph 130A may include all the information of the abstract syntax tree 110A. Because the abstract code graph 130A may include nodes which may be more abstract than the nodes of the abstract syntax tree 110A (such as, for example the abstract root node 102, the abstract branch nodes 105, and the abstract leaf nodes 108), the abstract code graph 130A may include more information, and in some instances more nodes, than the abstract syntax tree 110A.

In some embodiments, the abstract code graph 130A may include one or more merge nodes. The merge nodes may include all of the information of the original nodes, including the construct which the original nodes represented, and the level of abstraction with which the original nodes represented the construct. Further, a particular merge node may be connected to all of the nodes to which the constituent nodes were connected. Thus, the abstract code graph 130A may include the same information, even if it includes fewer nodes, than the abstract syntax tree 110A.

For illustration purposes the abstract code graph 130A may be generated by the abstract code graph generator 120 of FIG. 1A. Further, the abstract code graph 130A may be based on the abstract syntax tree 110A of FIG. 1B. The abstract code graph 130A may be generated by generating an abstract node for each node in the abstract syntax tree 110A and merging nodes from the abstract syntax tree 110A and abstract nodes.

Continuing the example described above with regard to FIG. 1B, the abstract code graph 130A may represent the source code "if (closable !=null) closable.close( );." The abstract root node 102 may represent the construct "if" as "StmtList," which may be more abstract than the root node 103A representation of "IfStmt." The abstract branch node 105A may represent the construct "!=" as "Expr," which may be more abstract than the branch node 106A representation of "Op !=." The abstract leaf node 108I may represent the construct "closable" at the first location in the source code as "Type File," which may be more abstract than the leaf node 109F representation of "Name closable." The abstract leaf node 108H may represent the construct "closable" at the first location in the source code as "Var," which may be more abstract than the leaf node 109F representation of "Name closable," and the abstract leaf node 108H representation of "Type File." The abstract leaf node 109C may represent the construct "null" as "Const" which may be more abstract than the leaf node 109B representation of "Const null." The abstract branch node 105B may represent the construct "close( )" as "StmtList," which may be more abstract than the branch node 106B representation of "MethodCall." The abstract leaf node 109F may represent the construct "close( )" as "Id," which may be more abstract than the leaf node 109D representation of "Id close." And the abstract leaf node 109G may represent construct of the return of "close( )," "Void," as "ExprList," which may be more abstract than the representation of leaf node 109E of "Void."

Modifications, additions, or omissions may be made to the abstract code graph 130A without departing from the scope of the present disclosure. For example, though illustrated with only one layer of branch nodes 106, the abstract code graph 130A may include any number of layers of branch nodes 106.

The generation of abstract nodes and the merging of nodes may be accomplished in any order or at substantially the same time. For example, the generating of abstract nodes may occur first, as illustrated in intermediate abstract code graph 125A of FIG. 1C. Then, the merging of nodes may occur resulting in the abstract code graph 130A of FIG. 1F. Alternatively, the merging of nodes may occur first, as illustrated in the intermediate abstract code graph 125B of FIG. 1E. Then the generating of abstract nodes may occur resulting in the abstract code graph 130A of FIG. 1F. Alternatively, the generating of abstract nodes and the merging of the nodes may occur at substantially the same time.

Figure 1G:
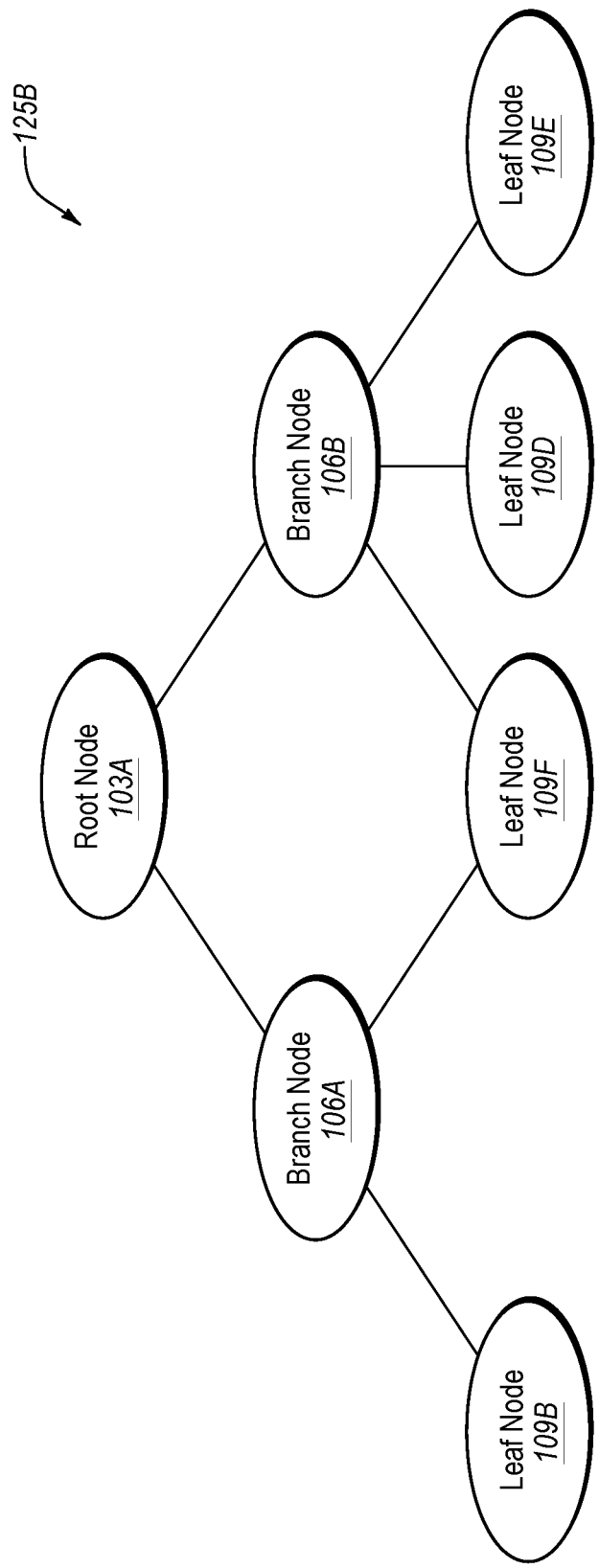
FIG. 1G is a block diagram of another example intermediate abstract code graph.

For example, FIG. 1G illustrates an example intermediate abstract code graph 125B according to at least one embodiment described in this disclosure. With respect to at least some embodiments, the intermediate abstract code graph 125B may merely help in understanding how the abstract code graph generator 120 may arrive at generating the abstract code graph 130A. In general the intermediate abstract code graph 125B may represent source code including representing the source code with a level of abstraction. Though illustrated, the intermediate abstract code graph 125B may be conceptual.

In some embodiments the intermediate abstract code graph 125B may include a root node 103A, one or more branch nodes 106, and one or more leaf nodes 109. Two branch nodes are illustrated in FIG. 1G: branch node 106A, and branch node 106B, (collectively referred to as branch nodes 106 and/or individually referred to as branch node 106). Four leaf nodes are illustrated in FIG. 1G. For illustration purposes, the leaf nodes have been ordered and labeled to correspond with FIG. 1F. The four leaf nodes of FIG. 1G include leaf node 109B, leaf node 109D, leaf node 109E, and leaf node 109F (collectively referred to as leaf nodes 109 and/or individually referred to as leaf node 109). However, the number of branch nodes, and/or leaf nodes may vary according to different implementations.

For illustration purposes the intermediate abstract code graph 125B may be generated by the abstract code graph generator 120 of FIG. 1A as an intermediate step in generating the abstract code graph 130A of FIG. 1F. The intermediate abstract code graph 125B may be generated by merging one or more nodes of the abstract syntax tree 110A of FIG. 1B. The merging may happen in the same manner, or a substantially similar manner to the merging described above with regard to FIG. 1C.

For example, the abstract code graph generator 120 may merge the leaf node 109A and the leaf node 109C of the abstract syntax tree 110A of FIG. 1B to form the leaf node, the leaf node 109F of FIG. 1G. The merging of the leaf node 109A and the leaf node 109C may be based on a determination that the leaf node 109A and the leaf node 109C represent the same construct in the source code. The leaf node 109F may be connected to all of the nodes to which the leaf node 109A and the leaf node 109C were connected. Thus, the leaf node 109F may be connected to the branch node 106A and the branch node 106B.

Continuing the example described above with regard to FIG. 1B, the leaf node 109A may represent the construct "closable" at the first location in the source code as "Var closable." And the leaf node 109C may represent the construct "closable" at the second location in the source code as "Var closable." Thus, the abstract code graph generator 120 may merge the leaf node 109A and the leaf node 109C to form the leaf node 109F which may also represent the construct "closable" as "Var closable." Also, because the leaf node 109A was connected to branch node 106A, and the leaf node 109B was connected to branch node 106B, the leaf node 109F may be connected to both branch node 106A and branch node 106B.

To generate an abstract code graph 130A, as described above with regard to FIG. 1F from intermediate abstract code graph 125B the abstract code graph generator 120 may generate one or more abstract nodes for each node in the intermediate abstract code graph 125B. The abstraction may be done in a way similar to the abstraction described above with regard to FIG. 1E.

For example, to form the abstract code graph 130A of FIG. 1F the abstract code graph generator 120 may generate the abstract root node 102 based on the root node 103A of the intermediate abstract code graph 125B. Also, the abstract code graph generator 120 may generate the abstract branch nodes 105 based on the branch nodes 106 of the intermediate abstract code graph 125B. Also, the abstract code graph generator 120 may generate the abstract leaf nodes 108 based on the leaf nodes 109 of the intermediate abstract code graph 125B. For example, the abstract leaf node 108I and the abstract leaf node 108H may be based on the leaf node 109F of the intermediate abstract code graph 125B.

Figure 1H:
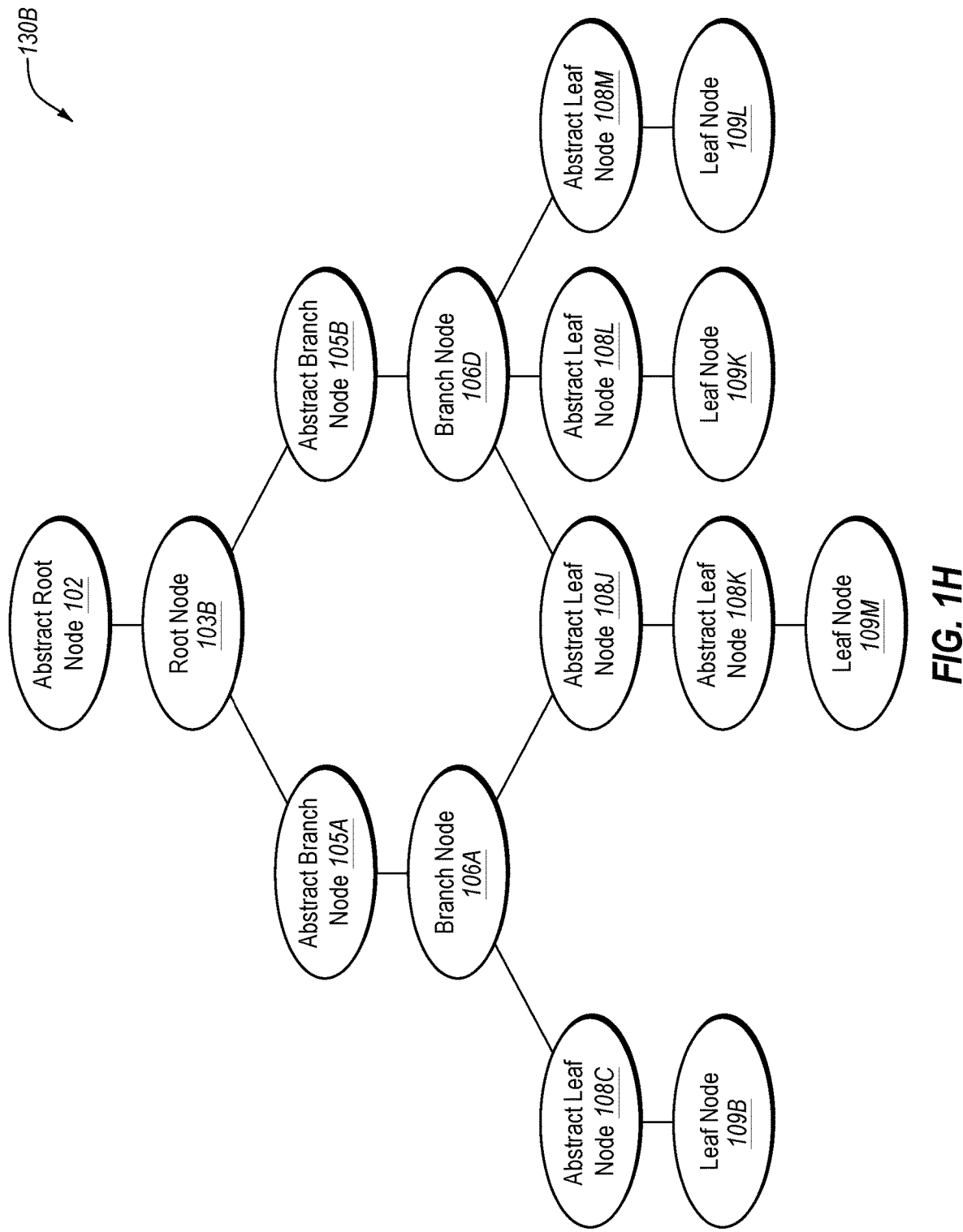
FIG. 1H is a block diagram of an example difference abstract code graph.

Modifications, additions, or omissions may be made to the intermediate abstract code graph 125B without departing from the scope of the present disclosure. For example, though illustrated with only one layer of branch nodes 106, the intermediate abstract code graph 125B may include any number of layers of branch nodes 106. The difference abstract code graph 130A may be an example of an abstract code graph 130; FIG. 1H illustrates another example of an abstract code graph 130.

FIG. 1H illustrates an example difference abstract code graph 130B according to at least one embodiment described in this disclosure. The difference abstract code graph 130B may be an example of an abstract code graph 130 of FIG. 1A. In general the difference abstract code graph 130B may include a representation of first constructs of first source code and relationships between the first constructs of the first source code, second constructs of second source code, and relationships between the second constructs of the second source code. Though illustrated, the difference abstract code graph 130B may be conceptual.

In some embodiments the difference abstract code graph 130B may be based on the difference abstract syntax tree 110D of FIG. 1D. In some embodiments the difference abstract syntax tree 110D may be generated according to the same principles illustrated above with regard to FIGS. 1E-1G. In some embodiments the difference abstract syntax tree 110D may be generated by the abstract code graph generator 120 of FIG. 1A.

A difference abstract code graph 130B may retain information about the source code from which one or more nodes of the difference abstract code graph 130B originated. Additionally or alternatively the difference abstract code graph 130B may retain information about which nodes of the difference abstract code graph 130B may have been root nodes in an abstract syntax tree, such as, for example the abstract syntax tree 110B.

In some embodiments the difference abstract code graph 130B may include one or more abstract root nodes 102, one or more root nodes 103B, one or more abstract branch nodes 105, one or more branch nodes 106, one or more abstract leaf nodes 108, and one or more leaf nodes 109. Two abstract branch nodes are illustrated in FIG. 1H: abstract branch node 105A, and abstract branch node 105B, (collectively referred to as abstract branch nodes 105 and/or individually referred to as abstract branch node 105). Two branch nodes are illustrated in FIG. 1H: branch node 106A, and branch node 106D, (collectively referred to as branch nodes 106 and/or individually referred to as branch node 106). Five abstract leaf nodes are illustrated in FIG. 1H: abstract leaf node 108C, abstract leaf node 108J, abstract leaf node 108K, abstract leaf node 108L, and abstract leaf node 108M (collectively referred to as abstract leaf nodes 108 and/or individually referred to as abstract leaf node 108). Four leaf nodes are illustrated in FIG. 1H: leaf node 109B, leaf node 109K, leaf node 109L, and leaf node 109M (collectively leaf nodes are referred to as leaf nodes 109 and/or individually referred to as leaf node 109). However, the number of abstract branch nodes, branch nodes, abstract leaf nodes and/or leaf nodes may vary according to different implementations.

Modifications, additions, or omissions may be made to the difference abstract code graph 130B without departing from the scope of the present disclosure. For example, though illustrated with only one layer of branch nodes 106, the intermediate abstract code graph 125B may include any number of layers of branch nodes 106.

Returning now to FIG. 1A, in some embodiments the system 100 may include a subgraph generator 140 according to at least one embodiment described in this disclosure. In general the subgraph generator 140 may be configured to generate one or more subgraphs 150 from the abstract code graph 130. In some embodiments the subgraph generator 140 may be configured to select a subset of nodes of the abstract code graph 130 as one or more subgraphs 150.

In general the subgraphs 150 may include a representation of constructs of source code and relationships between constructs of the source code. The subgraphs 150 may be conceptual. For example the subgraphs 150 may be stored in computer memory as a table, list, or other data structure.

In some embodiments the subgraphs 150 may include new data structures or graphs that include the subgraphs 150. In these or other embodiments the nodes of the abstract code graph 130 that are included in the subgraphs 150 may be designated in the abstract code graph 130 without generating a new data structure. In the present disclosure selecting and/or designating nodes of the abstract code graph 130 to form a subgraphs 150 may be referred to as generating a subgraph 150 from or based on the abstract code graph 130.

In some embodiments the subgraphs 150 may include a one or more nodes which may be from or based on the nodes of the abstract code graph 130. For example the subgraphs 150 may include nodes that are incorporated from, or generated based on the nodes of the abstract code graph 130. In some embodiments the subgraphs 150 may include the nodes of the abstract code graph 130. In some embodiments the abstract code graph 130 may include one or more subgraphs 150. For example, one or more nodes of the abstract code graph 130 may be designated as part of one or more of the subgraphs 150. In the present disclosure the generation of subgraphs 150 may be referred to as selection of nodes without regard for whether the subgraphs are generated based on the abstract code graph 130 or the subgraphs 150 are included in the abstract code graph 130.

The subgraphs 150 may include one or more nodes. The nodes of the subgraphs 150 may include a root node, one or more branch nodes, and one or more leaf nodes. Because the subgraphs 150 may be based on abstract code graph 130, the subgraphs 150 may also include merge nodes and constituent nodes. In the present disclosure leaf nodes in the subgraphs 150 may be referred to as "split nodes." And, in the present disclosure, nodes of the abstract code graph 130 that correlate to split nodes of the subgraphs 150 may also be referred to as "split nodes." The split nodes of an abstract code graph 130 may not be leaf nodes of the abstract code graph 130.

In some embodiments, the subgraph generator 140 may select one or more nodes of the abstract code graph 130 according to one or more rules. In some embodiments, the rules for forming subgraphs 150 may include a rule such that at least one root node of the abstract code graph 130 is selected. Additionally or alternatively, the rules may include a rule such that each node selected is connected to at least one other node. Additionally or alternatively, the rules may include a rule such that each node selected is related through one or more connections to at least one root node of the abstract code graph 130. Additionally or alternatively, the rules may include a rule such that all possible paths in the abstract code graph 130 from a root node of the abstract code graph 130 to a leaf node of the abstract code graph 130 include no more than one node in the abstract code graph 130 that correlates to a split node in a particular subgraph 150.

In some embodiments the subgraph generator 140 may include code and routines configured to enable a computing system to perform one or more operations to generate a subgraph. Additionally or alternatively, the subgraph generator 140 may be implemented using hardware including a processor, a microprocessor (e.g., to perform or control performance of one or more operations), an FPGA, or an ASIC. In some other instances, the subgraph generator 140 may be implemented using a combination of hardware and software. In the present disclosure, operations described as being performed by the subgraph generator 140 may include operations that the subgraph generator 140 may direct a system to perform.

Modifications, additions, or omissions may be made to the subgraph generator 140 without departing from the scope of the present disclosure. For example, in some embodiments the subgraph generator 140 may generate the subgraphs 150 from an abstract syntax tree 110 or from source code. In some embodiments the subgraph generator 140 may generate all possible combinations of nodes without regard for any rules. Further, the order of operations may vary according to different implementations.

Returning now to FIG. 1D examples of subgraphs are illustrated with regard to the abstract code graph 130A of FIG. 1D. Although the subgraphs 150 may be separate from the abstract code graph 130A, in the present disclosure, one or more nodes of the abstract code graph 130A may be referred to as part of the subgraphs 150.

As an example of generating a particular subgraph, the abstract root node 102, the root node 103A, the abstract branch node 105A, the branch node 106A, the abstract leaf node 108C, the abstract leaf node 108H, the abstract branch node 105B, the branch node 106B, the abstract leaf node 108F, and the abstract leaf node 108G may all be selected as part of the particular subgraph.

Above, with regard to the operation of the subgraph generator 140, several rules were described. In some embodiments, one or more these rules may be implemented by the subgraph generator 140 to determine valid subgraphs 150. Here, examples of generating subgraphs according to and in violation of the rules is illustrated. However, the subgraph generator 140 may generate subgraphs 150 using one or more other rules than those described above.

The subgraph generator 140 may implement the rule such that at least one root node of the abstract code graph 130A is selected then valid subgraphs 150 may all include the abstract root node 102. In other words, any subgraph 150 that doesn't include the abstract root node 102 would be in violation of the rule such that at least one root node of the abstract code graph 130A is selected. For example, the abstract branch node 105A, the branch node 106A, the abstract leaf node 108C, and the abstract leaf node 108H alone do not for a valid subgraph according to the rule such that at least one root node of the abstract code graph 130A is selected. However, because the abstract branch node 105B of FIG. 1H was a root node of the abstract syntax tree 110C of FIG. 1F, the abstract branch node 105B, the branch node 106B, the abstract leaf node 108H, the abstract leaf node 108F, and the abstract leaf node 108G alone can form a valid subgraph according to the rule such that at least one root node of the abstract code graph 130A is selected.

The subgraph generator 140 may implement the rule such that each node selected is connected to at least one other node then valid subgraphs 150 may not include any nodes that are not connected to at least one other node. In other words, any subgraph 150 that includes a node without any connections would be in violation of the rule such that each node selected is connected to at least one other node. For example the abstract root node 102, the root node 103A, the abstract branch node 105A, and the abstract leaf node 108C do not form a valid subgraph according to the rule such that each node selected is connected to at least one other node.

The subgraph generator 140 may implement the rule such that each node selected is related through one or more connections to at least one root node of the abstract code graph 130A then valid subgraphs 150 may not include any nodes that are not related through one or more connections to the root node of the abstract code graph 130A. In other words, any subgraph 150 that includes one or more nodes that are not related to the root node of the abstract code graph 130A through one or more connections violates the rule such that each node selected is related through one or more connections to at least one root node of the abstract code graph 130A. For example the abstract root node 102, the root node 103A, the abstract branch node 105A, the abstract branch node 105B, the abstract leaf node 108F, and the abstract leaf node 108G do not form a valid subgraph according to the rule such that each node selected is related through one or more connections to at least one root node of the abstract code graph 130A.

In some embodiments the relation to the root node referred to in the rule such that each node selected is related through one or more connections to at least one root node of the abstract code graph 130A may not include relations that go uniformly from more abstract to less abstract or relations that go from parent to child. For example the abstract root node 102, the root node 103A, the abstract branch node 105A, the branch node 106A, the 108H, the branch node 106B, and the abstract leaf node 108G do not form a valid subgraph according to the rule such that each node selected is related through one or more connections to at least one root node of the abstract code graph 130A because the abstract leaf node 108G is related to the abstract root node 102 through a connection that goes from more abstract to less abstract (the connection between the branch node 106B and the abstract leaf node 108H).

In the present disclosure the rule such that all possible paths in the abstract code graph 130A from a root node of the abstract code graph 130A to a leaf node of the abstract code graph 130A include no more than one node in the abstract code graph 130A that correlates to a split node in a particular subgraph 150 may be referred to as the "split node rule." Operations related to checking to determine whether a candidate subgraph is in accordance with the split node rule is illustrated.

For illustration purposes, nodes of the candidate subgraph may be identified. From among the nodes of the candidate subgraph, split nodes may be identified. The split nodes may be identified as the leaf nodes of the candidate subgraph. Paths from the root node of the abstract code graph 130A to each leaf node of the abstract code graph 130A may be identified. In some embodiments "paths" may include only the most direct path. For example, a path from the abstract root node 102, to the root node 103A, to the abstract branch node 105B, to the branch node 106B, to the abstract leaf node 108H, to the branch node 106A may not be considered a valid path if the abstract branch node 105A and the branch node 106A are both included in the subgraph. Also, in some embodiments the subgraph may be considered a directed acyclic graph such that each edge in the subgraph has a direction. In these or other embodiments the "paths" of the subgraph may only include connections between nodes that follow the direction of the edges. The identified paths may be compared to the split nodes to determine whether any of the paths include more than one split node. In response to a determination that any of the identified paths includes more than one split node, a determination may be made that the candidate subgraph is not a valid subgraph according to the split node rule. However in response to a determination that none of the identified paths includes more than one split node, the candidate subgraph may be identified as a valid subgraph according to the split node rule.

As an example of the implementation of the subgraph rule, a candidate subgraph may include the abstract root node 102, the root node 103A, the abstract branch node 105A, the branch node 106A, the abstract leaf node 108C, the abstract leaf node 108H, the abstract branch node 105B, the branch node 106B, the abstract leaf node 108F, and the abstract leaf node 108G. In this example, the leaf nodes of the candidate subgraph, and thus the split nodes may include: the abstract leaf node 108C, the abstract leaf node 108H, the abstract leaf node 108F, and the abstract leaf node 108G. All paths from the abstract root node 102 to the leaf node 109B, the leaf node 109F, the leaf node 109D, and the leaf node 109E may be identified. The candidate subgraph may be a valid subgraph under the split node rule all possible paths from the abstract root node 102 to the each of the leaf nodes 109 of the abstract code graph include no more than one split node. For example, all possible paths from the abstract root node 102 to the leaf node 109B only include one split node, the abstract leaf node 108H, Further all possible paths from the abstract root node 102 to the leaf node 109F only include one split node, the branch node 108H. Further all possible paths from the abstract root node 102 to the leaf node 109D only includes one split node, the branch node abstract leaf node 108F. Further all possible paths from the abstract root node 102 to the leaf node 109E only includes one split node.

An example of a candidate subgraph that violates the subgraph rule would be a subgraph that includes only: the abstract root node 102, the root node 103A, the abstract branch node 105A, the branch node 106A, the abstract leaf node 108C, the abstract leaf node 108H, and the abstract branch node 105B. The candidate subgraph is not valid according to the split node rule because there is a path between the abstract root node 102 and the leaf node 109F that includes two split nodes. The split nodes of the valid subgraph are the abstract leaf node 108C, the abstract leaf node 108H, and the abstract branch node 105B. The path that include two split nodes is the path from abstract root node 102 to the root node 103A, to the abstract branch node 105B, to the branch node 106A, to the abstract leaf node 108H, to the abstract leaf node 108I, to the leaf node 109F. The path includes both the abstract branch node 105B, and the abstract leaf node 108H, both of which are split nodes.

The subgraphs 150 may be in accordance with none, one, some, or all of the rules described. In other words, the subgraph generator 140 may implement none, one, some, or all of the rules described. In some embodiments there may be different ways of describing or implementing the rules described herein. For example, the rule such that each node selected is connected to at least one other node may be described as "no isolated nodes." In some embodiments there may be additional or alternative rules describing the subgraphs 150.

In some embodiments the rules describing subgraphs may be related to a principle of subgraphs. The principle of subgraphs may be related to the reconstruction of source code based on the subgraphs. For example, reconstructed source code may be generated based on a subgraph. The reconstruction may replace each construct of the source code with a representation of the construct from the subgraph. In some embodiments the reconstruction may replace each construct of the source code with the least abstract representation of that construct found in the subgraph. In some embodiments an ancestor node may be used to represent a descendant node that is included in the abstract code graph 130A, but not in the subgraph. The principle of subgraphs may include that in the reconstruction, each construct may only be able to be represented by one level of abstraction if the least abstract representation from the subgraph is used in the reconstruction. For example, in the example given above of the abstract root node 102, the root node 103A, the abstract branch node 105A, the branch node 106A, the abstract leaf node 108C, the abstract leaf node 108H, and the abstract branch node 105B both the abstract branch node 105B and the abstract leaf node 108H could be used to represent the construct represented by the leaf node 109F at different locations in the source code.

Returning now to FIG. 1A, in some embodiments, the system 100 may include an abstract code graph analyzer 160. In general the abstract code graph analyzer 160 may be configured to analyze one or more abstract code graphs 130 and/or one or more subgraphs 150.

For example, in some embodiments, the abstract code graph analyzer 160 may be configured to compare the abstract code graph 130 with other abstract code graphs. In some embodiments, the abstract code graph analyzer 160 may compare the abstract code graph 130 with other abstract code graphs from the same software program. In these or other embodiments, the abstract code graph analyzer 160 may compare the abstract code graph 130 with other abstract code graphs from other software programs (e.g., other abstract code graphs generated from big code). For example, in some embodiments, the abstract code graph analyzer 160 may compare the abstract code graph 130 with abstract code graphs from big code to identify common code patterns that may be found in code under test. In these or other embodiments, the abstract code graph analyzer 160 may use comparisons of one or more abstract code graphs 130 of big code to identify the common code patterns.

For example, in some embodiments, the abstract code graph analyzer 160 may be configured to compare one or more subgraphs 150 with other subgraphs. In some embodiments, the abstract code graph analyzer 160 may compare one or more subgraphs 150 with other subgraphs from the same software program. In these or other embodiments, the abstract code graph analyzer 160 may compare one or more subgraphs 150 with other subgraphs from other software programs (e.g., other subgraphs generated from big code). For example, in some embodiments, the abstract code graph analyzer 160 may compare the one or more subgraphs 150 with subgraphs from big code to identify common code patterns that may be found in code under test. In these or other embodiments, the abstract code graph analyzer 160 may use comparisons of one or more subgraphs of big code to identify the common code patterns.

Additionally or alternatively the abstract code graph analyzer 160 may compare one or more abstract code graphs 130 with one or more subgraphs 150. Either or both of the abstract code graph 130 and the subgraphs 150 may be from the same software program, from different software programs, or from big code.

In some embodiments the abstract code graph analyzer 160 may compare two or more abstract code graphs 130 with each other by comparing one or more nodes of the abstract code graphs 130 and/or the overall structure of the abstract code graphs 130. In some embodiments the system 100 may generate a hash value representing one or more of the abstract code graphs 130 according to any suitable operation for generating a hash value. In some embodiments the abstract code graph analyzer 160 may compare hash values of one or more abstract code graphs 130.

For an example of comparing abstract code graphs 130 and/or subgraphs 150, in some embodiments source code may be reconstructed from an abstract code graph 130 and/or a subgraph 150. The reconstructed source code may be related to the original source code such as, for example by including the same constructs as the original source code. However, the reconstructed source code may include abstract representations of one or more of the constructs whereas the original source code may include the literal constructs. The reconstructed source code may include text. The text of the reconstructed source code may be hashed by a hashing algorithm, such as, for example, Message Digest 5 (MD5). The hashing algorithm may generate hash values. The hashing algorithm may be run on abstract code graphs 130 and/or subgraphs 150 which may be from, for example, big code. The hash values may be compared. A correspondence between hash values may indicate that the text on which the hash values are based is related or the same.

In some embodiments the abstract code graph analyzer 160 may include code and routines configured to enable a computing system to perform one or more operations to analyze an abstract code graph. Additionally or alternatively, the abstract code graph analyzer 160 may be implemented using hardware including a processor, a microprocessor (e.g., to perform or control performance of one or more operations), an FPGA, or an ASIC. In some other instances, the abstract code graph analyzer 160 may be implemented using a combination of hardware and software. In the present disclosure, operations described as being performed by the abstract code graph analyzer 160 may include operations that the abstract code graph analyzer 160 may direct a system to perform.

Modifications, additions, or omissions may be made to the abstract code graph analyzer 160 without departing from the scope of the present disclosure. Further, the order of operations may vary according to different implementations.

The system 100 may be used to analyze a particular software program. The particular software program may be software under test. The system 100 may generate abstract syntax tree 110 relating to the particular software program. Additionally or alternatively the abstract code graph generator 120 may generate the abstract code graph 130 relating to the particular software program. Additionally or alternatively the subgraph generator 140 may generate one or more subgraphs 150 relating to the abstract code graph 130. Additionally or alternatively, the abstract code graph analyzer 160 may analyze one or more of the abstract code graph 130 and/or the subgraphs 150 relating to the particular software program. The analysis of the particular software program may include comparisons of the abstract code graph 130 and/or the subgraphs 150 with other software programs which may include software programs from big code.

Additionally or alternatively the system 100 may be used to analyze big code. The system 100 may analyze one software program found in big code at a time. The system 100 may form a repository of analysis results. For example, the system 100 may generate abstract syntax tree 110 relating to a software program found in big code. Additionally or alternatively the abstract code graph generator 120 may generate abstract code graph 130 relating to a software program found in big code. Additionally or alternatively the subgraph generator 140 may generate one or more subgraphs 150 relating to a software program found in big code. Additionally or alternatively the abstract code graph analyzer 160 may analyze one or more of the abstract code graph 130 and/or the subgraphs 150 relating to a software program found in big code. One or more of the abstract syntax tree 110, the abstract code graph 130, and/or the subgraphs 150 resulting from analysis of the big code may be stored in the repository. Additionally or alternatively, one or more code patterns identified may be stored in the repository.

In some embodiments the system 100 may identify common code patterns in the big code based on analysis of the software programs of the big code. For example, the system 100 may analyze a particular software program and may generate an abstract syntax tree 110, an abstract code graph 130, and one or more subgraphs 150 based on the particular software program. The system 100 may compare the abstract syntax tree 110, the abstract code graph 130, and/or the subgraphs 150 with other abstract syntax trees, other abstract code graphs, and other subgraphs of the repository. In some embodiments, for instance, a particular abstract code graph 130 of the particular software program may correlate with one or more of the other abstract code graphs 130 of the repository, the system 100 may increment a counter of the number of occurrences of the particular abstract code graph 130.

In some embodiments, rather than storing the abstract code graphs 130, and/or the subgraphs 150, data values representing the abstract code graphs 130 and/or the subgraphs 150 may be stored in the repository. For example, a hash value representing the abstract code graphs 130 and or the subgraphs 150 may be stored. The abstract code graph analyzer 160 may compare the hash values of one or more abstract code graphs 130 and/or subgraphs 150. In some embodiments the repository may contain only one instance of the abstract code graph 130 and or the a particular subgraph 150 and may include a count of the number of occurrences of any particular abstract code graph 130 and/or the subgraph 150 that have been analyzed. Additionally or alternatively the repository may include only a hash value representing the particular abstract code graph 130 and the particular subgraph 150 and a count of the number of occurrences of the particular abstract code graph 130 and/or the particular subgraph 150 that have been analyzed.

In some embodiments common code patterns may be identified based on the frequency of occurrence of an abstract code graph 130 and/or a subgraphs 150 in the big code. In the present disclosure the occurrence of code that may be abstracted into an abstract code graph in the big code in the big code or in software under test may be referred to as the occurrence of the abstract code graph in the big code or in the software under test. In the present disclosure identifying an abstract code graph as a common code pattern may refer to identifying the code on which the abstract code graph is based as a common code pattern.

For example, if analysis of the big code determines that a particular abstract code graph 130 occurs in the big code more than a threshold number of times, the abstract code graph 130, and/or the source code related to the abstract code graph 130 may be identified as a common code pattern. In these or other embodiments, the threshold may be based on the total number of abstract code graphs that have been analyzed or generated; and/or the size of the repository. For instance, the threshold may be a percentage of the total number of abstract code graphs in the repository. Additionally or alternatively, the threshold may be based on the number of software programs analyzed. For instance, the determination of whether an abstract code graph of the repository relates to a common code pattern may be based on how many software programs are associated with that abstract code graph. For example, any abstract code graph found in more than 75% of all software programs analyzed may be determined to be a common code pattern.

In some embodiments the results of the analysis of one or more software programs may be used in debugging operations. For example, code under test may be analyzed by the system 100. For instance, the system 100 may generate one or more subgraphs 150 based on the software under test. The system 100 may compare the one or more subgraphs 150 with other subgraphs 150 of other software found in the repository. One or more debugging operations may be based on the results of the comparison indicating a correlation between a particular subgraph 150 of the software under test and another subgraph of the repository.

For example, during software development, a prompt may be generated and/or displayed to a developer based on the results of a comparison of one or more abstract code graphs and/or subgraphs. For instance, a human software developer may enter a line of code, such as, for example "closable.close( );" into an integrated development environment. Based on a comparison of a subgraph of the line of code with other subgraphs the integrated development environment may suggest a precondition, such as, for example, "if (closable !=null)."

For another example of the results of comparisons between abstract code graphs, and/or subgraphs being used in debugging operations, automated software development may generate code based on abstract code graphs. For instance an automated software development tool may generate code based on abstract code graphs from the repository.

For another example of the results of comparisons between abstract code graphs, and/or subgraphs being used in debugging operations, automated testing of software may be guided based on the results of software analysis including one or more abstract code graphs. For instance, software under test may include a particular abstract code graph 130 that may correspond to a code pattern of the big code that has been identified as potentially vulnerable. The automated testing of the software may focus on code related to the particular abstract code graph 130.

For another example of the results of comparisons between abstract code graphs, and/or subgraphs being used in debugging operations, automated software repair operations may select repair candidates based on the results the comparisons. For instance, software under test may a line of code, such as, for example "closable.close( );." A subgraph of the line of code may correlate to a subgraph of a line of code from the big code, such as, for example, "if (closable !=null) closable.close( );." The line of code from the big code may be a repair candidate for the line of code in the software under test based on the correlation of the subgraphs. In some embodiments the subgraph from the repository may be based on a difference abstract code graph. Modifications, additions, or omissions may be made to the system 100 without departing from the scope of the present disclosure. For example, in some embodiments the system 100 may omit the system 100. For another example, the abstract code graph analyzer 160 may operate on code patterns. Further, the order of operations may vary according to different implementations. Moreover, although described separately, in some embodiments, two or more of the abstract code graph generator 120, the sub graph generator 140, and the abstract graph analyzer 160 may be part of a same system or divided differently than described. The delineation between these and other elements in the description is not limiting and is meant to aid in understanding and explanation of the concepts and principles used in the present disclosure.

Figure 2:
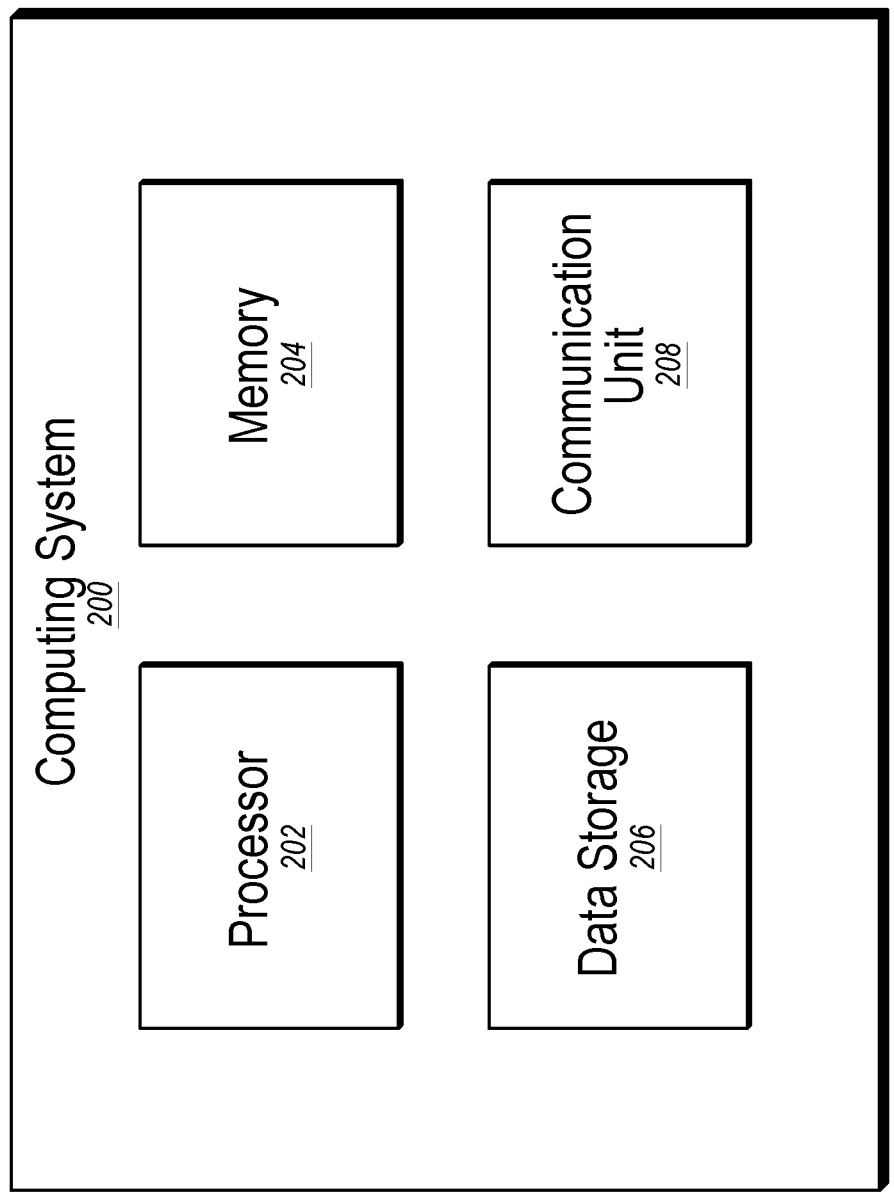
FIG. 2 is a block diagram of an example computing system.

FIG. 2 is a block diagram of an example computing system 200, which may be arranged in accordance with at least one embodiment described in this disclosure. As illustrated in FIG. 2, the system 200 may include a processor 202, a memory 204, a data storage 206, and a communication unit 208.

Generally, the processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, it is understood that the processor 202 may include any number of processors distributed across any number of network or physical locations that are configured to perform individually or collectively any number of operations described herein.

In some embodiments, the processor 202 may interpret and/or execute program instructions and/or process data stored in the memory 204, the data storage 206, or the memory 204 and the data storage 206. In some embodiments, the processor 202 may fetch program instructions from the data storage 206 and load the program instructions in the memory 204. After the program instructions are loaded into the memory 204, the processor 202 may execute the program instructions, such as instructions to perform one or more operations described with respect to the abstract code graph generator 120, the sub graph generator, 140, and/or the abstract graph analyzer 160 of FIG. 1A.

The memory 204 and the data storage 206 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 202. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations.

Modifications, additions, or omissions may be made to the system 200 without departing from the scope of the present disclosure. For example, the data storage 206 may be located in multiple locations and accessed by the processor 202 through a network.

Figure 3:
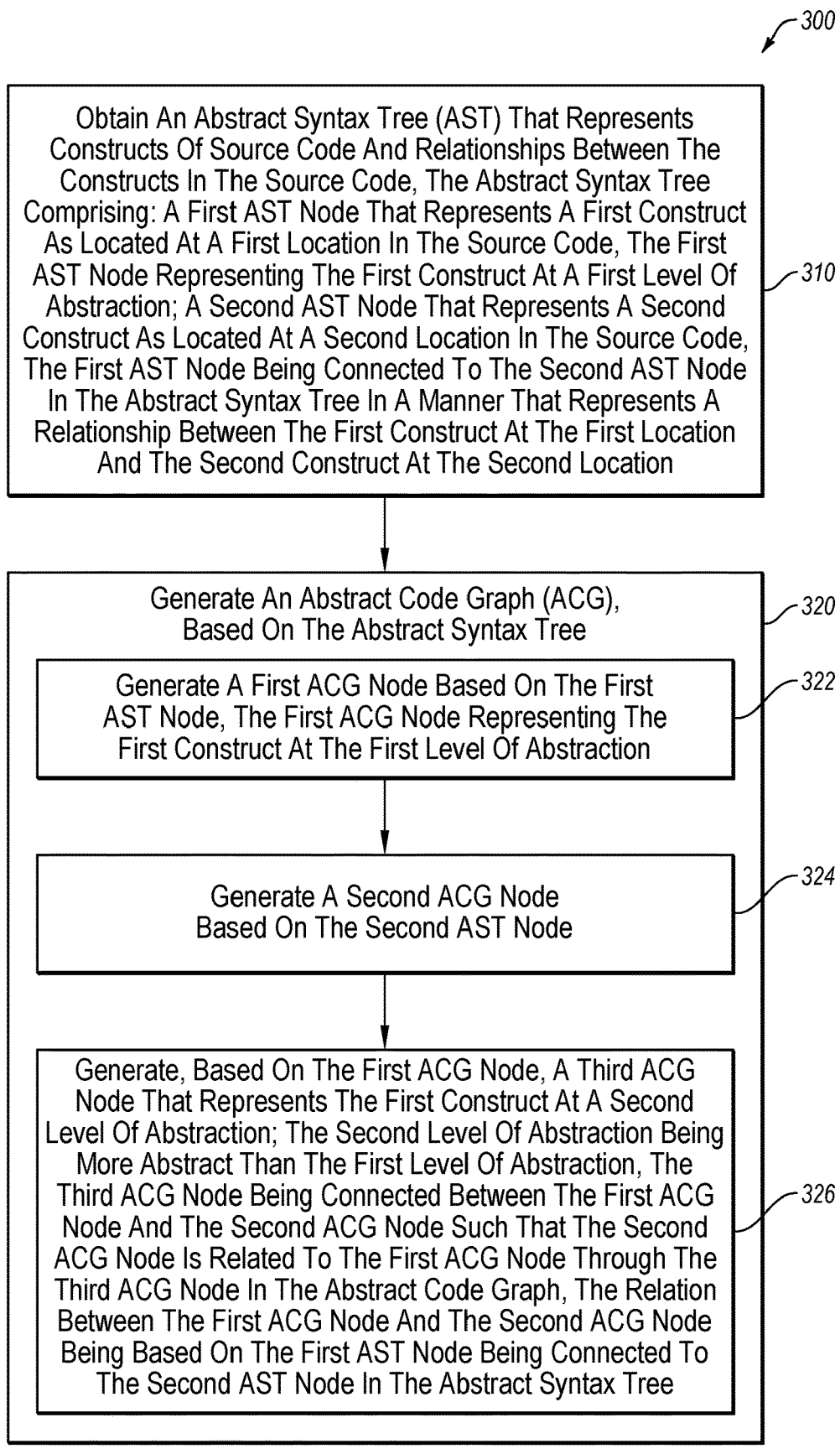
FIG. 3 is a flow chart of an example process for generating an abstract code graph.

FIG. 3 is a flow chart of an example method 300 configured to generate an abstract code graph, arranged in accordance with at least one embodiment described in this disclosure. In some embodiments, one or more of the operations associated with the method 300 may be performed by the system 100 of FIG. 1. The method 300 may be performed by any suitable system, apparatus, or device. For example, the computing system 200 of FIG. 2 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation. In general, the method 300 may obtain an abstract syntax tree and generate an abstract code graph based on the abstract syntax tree.

The method 300 may include the block 310. At the block 310 an abstract syntax tree may be obtained. The abstract syntax tree may be as described above with relation to abstract syntax tree 110 of FIG. 1A. The abstract syntax tree obtained at block 310 may represent constructs of source code and relationships between the constructs in the source code. The abstract syntax tree 110A of FIG. 1B may be an example of the abstract syntax tree obtained at block 310. Additionally or alternatively, the difference abstract syntax tree 110D of FIG. 1D may be an example of the abstract syntax tree obtained at block 310. The abstract syntax tree may include a first AST node and a second AST node.

The first AST Node may represent a first construct as located at a first location in the source code. The first AST node may represent the first construct at a first level of abstraction. The leaf node 109A of FIG. 1B may be an example of the first AST node. "if (closable !=null) closable.close( );" may be an example of the source code. The construct "closable" may be an example of the first construct. The representation "Var closable" may be an example of the representing the first construct ("closable") at the first level of abstraction. The first occurrence of the construct "closable" in the example source code ("if (closable !=null) closable.close( );") may be an example of the first location in the source code.

The second AST node that may represent a second construct as located at a second location in the source code. The branch node 106A of FIG. 1B may be an example of the second AST node. The construct "!=" may be an example of the second construct. The location of the "!=" in the source code may an example of the second location.

The first AST node may be connected to the second AST node in the abstract syntax tree in a manner that represents a relationship between the first construct at the first location and the second construct at the second location. The connection between the leaf node 109A and the branch node 106A of FIG. 1B may be an example of the connection between the first AST node and the second AST node. The way the construct "closable" and the construct "!=" relate to one another in the source code may be an example of the relationship between the first construct and the second construct.

The method 300 may include a block 320. At block 320 an abstract code graph may be generated based on the abstract syntax tree. The abstract code graph may be as described above with regard to FIG. 1F. The abstract code graph 130A of FIG. 1F may be an example of the abstract code graph generated at block 320. Additionally or alternatively the difference abstract code graph 130B of FIG. 1H may be an example of the abstract code graph generated at block 320.

The block 320 may include one or more blocks. In some embodiments the blocks illustrated inside the block 320 may be related to generating an abstract code graph. In some embodiments block 320 may be omitted and the blocks illustrated inside block 320 may be executed separately from block 320.

In some embodiments the method 300 may include the block 322. At the block 322 a first ACG node may be generated based on the first AST node. The first ACG node may represent the first construct at the first level of abstraction. The leaf node 109F of FIG. 1F may be an example of the first ACG node. The representation "Name closable" may be an example of the representing the first construct ("closable") at the first level of abstraction.

The method 300 may include a block 324. At the block 324 a second ACG node may be generated based on the second AST node. The branch node 106A of FIG. 1F may be an example of the second ACG node.

The method 300 may include a block 326. At the block 326 a third ACG node may be generated, based on the first ACG node. The third ACG node may represents the first construct at a second level of abstraction. The second level of abstraction being more abstract than the first level of abstraction. The abstract leaf node 108H of FIG. 1F may be an example of the third ACG node. The representation "Var" may be an example of the representing the first construct ("closable") at the second level of abstraction. The fact that the representation "Var" may be more abstract than the representation "Name closable" may be an example of the second level of abstraction being more abstract than the first level of abstraction.

The third ACG node may be connected between the first ACG node and the second ACG node such that the second ACG node may be related to the first ACG node through the third ACG node in the abstract code graph. The relation between the first ACG node and the second ACG node may be based on the first AST node being connected to the second AST node in the abstract syntax tree. The connection between the branch node 106A, the abstract leaf node 108H, and the leaf node 109F of FIG. 1F may be an example of the relation between the second ACG node, the third ACG node and the first ACG node.

In some embodiments additional operations may be performed. For example, the abstract syntax tree may further include a third AST node that may represent the first construct as located at a third location in the source code. The third AST node may represent the first construct at the first level of abstraction. The leaf node 109C of FIG. 1B may be an example of the third AST node. The second occurrence of the construct "closable" in the example source code ("if (closable !=null) closable.close( );") may be an example of the third location in the source code.

In these or other embodiments, generating the first ACG node based on the first AST node may include merging the first AST node and the third AST node into the first ACG node in response to the first AST node and the third AST node both representing the first construct at the first level of abstraction. The relationship between the leaf node 109F of FIG. 1G and the leaf node 109A of FIG. 1B and 109C of FIG. 1B may be an example of the merging of the first AST node and the third AST node into the first ACG node. For example, the leaf node 109A of FIG. 1B, being an example of the first AST node, and the leaf node 109C of FIG. 1B, being an example of the second AST node, may merge to form the first ACG node, of which may the leaf node 109G of FIG. 1G may be an example. In some embodiments the merging of the first AST node with the third AST node may occur prior to or substantially concurrently with the generation of the first ACG node.

In some embodiments additional operations may be performed. For example, the abstract syntax tree may further include a third AST node that represents a third construct as located at a third location in the source code. The branch node 106B of FIG. 1B may be an example of the third AST node. The construct "close( )" may be an example of the third construct.

In these or other embodiments, the abstract syntax tree may further include a fourth AST node that may represent the first construct as located at a fourth location in the source code and that represents the first construct at the first level of abstraction. The third AST node may be connected to the fourth AST node in the abstract syntax tree in a manner that may represent a relationship between the third construct at the third location and the first construct at the fourth location. The leaf node 109C of FIG. 1B may be an example of the fourth AST node. The fourth AST node may represent the construct "closable." The second occurrence of the construct "closable" in the example source code ("if (closable !=null) closable.close( );") may be an example of the fourth location in the source code. The representation "Var closable" may be an example of representing the first construct at the first level of abstraction. The connection between the leaf node 109C and the branch node 106B of FIG. 1B may be an example of the connection between the third AST node and the fourth AST node. The way the construct "closable" and the construct "close( )" relate to one another in the source code may be an example of the relationship between the third construct and the fourth construct.

In these or other embodiments, the block 320 may further include additional operations. The block 320 may include generating a fourth ACG node based on the fourth AST node; the fourth ACG node may represent the first construct at the first level of abstraction. The leaf node 109C may be an example of the fourth ACG node. The representation of the construct "closable" as "Name closable" may be an example of the representation of the first construct at the first level of abstraction.

In these or other embodiments the block 320 may further include generating a fifth ACG node based on the third AST node. The branch node 106B of the FIG. 1E may be an example of the fifth ACG node.

In these or other embodiments the block 320 may further include generating, based on the fourth ACG node, a sixth ACG node that may represent the first construct at the second level of abstraction. The sixth ACG node may be connected between the fourth ACG node and the fifth ACG node such that the fourth ACG node may be related to the fifth ACG node through the sixth ACG node in the abstract code graph. The relation between the fourth ACG node and the fifth ACG node may be based on the fourth AST node being connected to the third AST node in the abstract syntax tree. The abstract leaf node 108D of FIG. 1E may be an example of the sixth ACG node. The representation "Var" may be an example of the representing the first construct ("closable") at the second level of abstraction. The connection between the branch node 106B, the abstract leaf node 108D, and the leaf node 109C of FIG. 1E may be an example of the relation between the fifth ACG node, the sixth ACG node and the fourth ACG node.

In these or other embodiments the block 320 may further include merging, in response to both the first ACG node and the fourth ACG node representing the first construct at the first level of abstraction, the first ACG node and the fourth ACG node into a seventh ACG node that represents the first construct at the first level of abstraction. The leaf node 109F of FIG. 1F may represent the seventh node. For example, the leaf node 109A of FIG. 1E, being an example of the first ACG node, and the leaf node 109C of FIG. 1E, being an example of the fourth ACG node, may merge to form the seventh ACG node, of which may the leaf node 109F of FIG. 1F may be an example. In some embodiments the merging of the first ACG node with the fourth ACG node may occur prior to or substantially concurrently with the generation of the first ACG node and/or the fourth ACG node.

In these or other embodiments the block 320 may further include merging, in response to both the third ACG node and the sixth ACG node representing the first construct at the second level of abstraction, the third ACG node and the sixth ACG node into an eighth ACG node that represents the first construct at the second level of abstraction. The abstract leaf node 108H of FIG. 1F may be an example of the eighth node. For example, the abstract leaf node 108A of FIG. 1E, being an example of the third ACG node, and abstract leaf node 108D of FIG. 1E, being an example of the sixth ACG node, may merge to form the eighth ACG node, of which may the abstract leaf node 108H of FIG. 1F may be an example. In some embodiments the merging of the third ACG node with the sixth ACG node may occur prior to or substantially concurrently with the generation of the third ACG node, and/or the sixth ACG node.

Modifications, additions, or omissions may be made to the method 300 without departing from the scope of the present disclosure. Further, the order of operations may vary according to different implementations.

One skilled in the art will appreciate that, for the system 100, the method 300 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of generating an abstract code graph, the method comprising:
   obtaining an abstract syntax tree (AST) that represents constructs of source code and relationships between the constructs in the source code, the abstract syntax tree comprising:
      a first AST node that represents a first construct as recited at a first location in the source code; and
      a second AST node that represents a second construct as recited at a second location in the source code, the first AST node being connected to the second AST node in the abstract syntax tree in a manner that represents a relationship between the first construct at the first location and the second construct at the second location; and generating an abstract code graph (ACG), based on the abstract syntax tree, the generating of the abstract code graph comprising:
      generating a first ACG node based on the first AST node, the first ACG node representing the first construct at a first level of abstraction that corresponds to the first construct as recited in the source code at the first location;
      generating a second ACG node based on the second AST node;
      identifying a category descriptive of a characteristic of the first construct, the category also being descriptive of the characteristic with respect to other constructs; and
      generating, based on the first ACG node, a third ACG node that represents the first construct at a second level of abstraction that corresponds to the category in general, the third ACG node being connected between the first ACG node and the second ACG node, the second ACG node being related to the first ACG node through the third ACG node in the abstract code graph, the relation between the first ACG node and the second ACG node being based on the first AST node being connected to the second AST node in the abstract syntax tree.

2. The method of claim 1, wherein:
   the first AST node represents the first construct at a first level of abstraction;
   the abstract syntax tree further includes a third AST node that represents the first construct as recited at a third location in the source code, the third AST node representing the first construct at the first level of abstraction; and
   generating the first ACG node based on the first AST node comprises merging the first AST node and the third AST node into the first ACG node in response to the first AST node and the third AST node both representing the first construct at the first level of abstraction.

3. The method of claim 1, wherein:
   the abstract syntax tree further includes a third AST node that represents a third construct as recited at a third location in the source code;
   the abstract syntax tree further includes a fourth AST node that represents the first construct as recited at a fourth location in the source code, the third AST node being connected to the fourth AST node in the abstract syntax tree in a manner that represents a relationship between the third construct at the third location and the first construct at the fourth location; and
   generating the abstract code graph further comprises:
      generating a fourth ACG node based on the fourth AST node, the fourth ACG node representing the first construct at the first level of abstraction;
      generating a fifth ACG node based on the third AST node;
      generating, based on the fourth ACG node, a sixth ACG node that represents the first construct at the second level of abstraction, the sixth ACG node being connected between the fourth ACG node and the fifth ACG node such that the fourth ACG node is related to the fifth ACG node through the sixth ACG node in the abstract code graph, the relation between the fourth ACG node and the fifth ACG node being based on the fourth AST node being connected to the third AST node in the abstract syntax tree;
      merging, in response to both the first ACG node and the fourth ACG node representing the first construct at the first level of abstraction, the first ACG node and the fourth ACG node into a seventh ACG node that represents the first construct at the first level of abstraction; and
      merging, in response to both the third ACG node and the sixth ACG node representing the first construct at the second level of abstraction, the third ACG node and the sixth ACG node into an eighth ACG node that represents the first construct at the second level of abstraction.

4. The method of claim 1, wherein:
   the abstract syntax tree comprises a difference abstract syntax tree;
   the difference abstract syntax tree represents:
      the constructs of the source code;
      the relationships between the constructs in the source code;
      other constructs of other source code; and other relationships between the other constructs in the other source code; and the method further comprises generating the difference abstract syntax tree, the generating of the difference abstract syntax tree including:

obtaining a first abstract syntax tree that represents the constructs of the source code and the relationships between the constructs in the source code, the first abstract syntax tree comprising a third AST node that represents a third construct as located at a third location in the source code;

obtaining a second abstract syntax tree that represents the other constructs of the other source code and the other relationships between the other constructs in the other source code, the second abstract syntax tree comprising a fourth AST node that represents the third construct as located at a fourth location in the other source code; and merging, in response to both the third AST node and the fourth AST node representing the third construct, the third AST node and the fourth AST node into a fifth AST node of the different abstract syntax tree that represents the third construct.

5. The method of claim 1, further comprising:

comparing the abstract code graph with a plurality of abstract code graphs that are based on a plurality of existing software programs;

based on the comparing of the abstract code graph with the plurality of abstract code graphs, identifying occurrences, in the plurality of existing software programs, of a code pattern that corresponds to the abstract code graph; and performing debugging operations with relation to the source code, based on the identifying of the occurrences.

6. The method of claim 1, further comprising:

obtaining a subgraph of the abstract code graph according to one or more subgraph rules, wherein the subgraph comprises one or more ACG nodes.

7. The method of claim 6, further comprising obtaining all possible subgraphs according to the one or more subgraph rules.

8. The method of claim 6, wherein the subgraph includes one or more split nodes that are leaf nodes of the subgraph, and wherein the one or more subgraph rules comprise all possible paths in the abstract code graph from a root node of the abstract code graph to a leaf node of the abstract code graph include only one node in the abstract code graph that correlates to a split node of the subgraph.

9. The method of claim 6, further comprising:

comparing the subgraph with a plurality of subgraphs which are based on a plurality of existing software programs;

based on the comparing of the subgraph with the plurality of subgraphs, identifying occurrences, in the plurality of existing software programs, of a code pattern that corresponds to the subgraph; and performing debugging operations with relation to the source code, based on the identifying of the occurrences.

10. One or more non-transitory computer-readable storage media including computer-executable instructions configured to cause a system to perform operations, the operations comprising:

obtaining an abstract syntax tree (AST) that represents constructs of source code and relationships between the constructs in the source code, the abstract syntax tree comprising:

a first AST node that represents a first construct as recited at a first location in the source code; and a second AST node that represents a second construct as recited at a second location in the source code, the first AST node being connected to the second AST node in the abstract syntax tree in a manner that represents a relationship between the first construct at the first location and the second construct at the second location; and generating an abstract code graph (ACG), based on the abstract syntax tree, the generating of the abstract code graph comprising:

generating a first ACG node based on the first AST node, the first ACG node representing the first construct at a first level of abstraction;

generating a second ACG node based on the second AST node;

identifying a category descriptive of a characteristic of the first construct, the category also being descriptive of the characteristic with respect to other constructs; and generating, based on the first ACG node, a third ACG node that represents the first construct at a second level of abstraction that corresponds to the category in general, the third ACG node being connected between the first ACG node and the second ACG node, the second ACG node being related to the first ACG node through the third ACG node in the abstract code graph, the relation between the first ACG node and the second ACG node being based on the first AST node being connected to the second AST node in the abstract syntax tree.

11. The one or more computer-readable storage media of claim 10, wherein:

the first AST node represents the first construct at a first level of abstraction;

the abstract syntax tree further includes a third AST node that represents the first construct as recited at a third location in the source code, the third AST node representing the first construct at the first level of abstraction; and generating the first ACG node based on the first AST node comprises merging the first AST node and the third AST node into the first ACG node in response to the first AST node and the third AST node both representing the first construct at the first level of abstraction.

12. The one or more computer-readable storage media of claim 10, wherein:

the abstract syntax tree further includes a third AST node that represents a third construct as recited at a third location in the source code;

the abstract syntax tree further includes a fourth AST node that represents the first construct as recited at a fourth location in the source code, the third AST node being connected to the fourth AST node in the abstract syntax tree in a manner that represents a relationship between the third construct at the third location and the first construct at the fourth location; and generating the abstract code graph further comprises:

generating a fourth ACG node based on the fourth AST node, the fourth ACG node representing the first construct at the first level of abstraction;

generating a fifth ACG node based on the third AST node;

generating, based on the fourth ACG node, a sixth ACG node that represents the first construct at the second level of abstraction, the sixth ACG node being connected between the fourth ACG node and the fifth ACG node such that the fourth ACG node is related to the fifth ACG node through the sixth ACG node in the abstract code graph, the relation between the fourth ACG node and the fifth ACG node being based on the fourth AST node being connected to the third AST node in the abstract syntax tree;

merging, in response to both the first ACG node and the fourth ACG node representing the first construct at the first level of abstraction, the first ACG node and the fourth ACG node into a seventh ACG node that represents the first construct at the first level of abstraction; and merging, in response to both the third ACG node and the sixth ACG node representing the first construct at the second level of abstraction, the third ACG node and the sixth ACG node into an eighth ACG node that represents the first construct at the second level of abstraction.

13. The one or more computer-readable storage media of claim 10, wherein:

the abstract syntax tree comprises a difference abstract syntax tree;

the difference abstract syntax tree represents:
  the constructs of the source code;
  the relationships between the constructs in the source code;
  other constructs of other source code;
  relationships between the other constructs in the other source code; and
  other relationships between the constructs and the other constructs; and the operations further comprise generating the difference abstract syntax tree, the generating of the difference abstract syntax tree including:

obtaining a first abstract syntax tree that represents the constructs of the source code and the relationships between the constructs in the source code, the first abstract syntax tree comprising a third AST node that represents a third construct as located at a third location in the source code;

obtaining a second abstract syntax tree that represents the other constructs of the other source code and the other relationships between the other constructs in the other source code, the second abstract syntax tree comprising a fourth AST node that represents the third construct as located at a fourth location in the other source code; and merging, in response to both the third AST node and the fourth AST node representing the third construct, the third AST node and the fourth AST node into a fifth AST node of the different abstract syntax tree that represents the third construct.

14. The one or more computer-readable storage media of claim 10, further comprising:

comparing the abstract code graph with a plurality of abstract code graphs that are based on a plurality of existing software programs;

based on the comparing of the abstract code graph with the plurality of abstract code graphs, identifying occurrences, in the plurality of existing software programs, of a code pattern that corresponds to the abstract code graph; and performing debugging operations with relation to the source code, based on the identifying of the occurrences.

15. The one or more computer-readable storage media of claim 10, further comprising:

obtaining a subgraph of the abstract code graph according to one or more subgraph rules, wherein the subgraph comprises one or more ACG nodes.

16. The one or more computer-readable storage media of claim 15, wherein the subgraph includes one or more split nodes that are leaf nodes of the subgraph, and wherein the one or more subgraph rules comprise all possible paths in the abstract code graph from a root node of the abstract code graph to a leaf node of the abstract code graph include only one node in the abstract code graph that correlates to a split node of the subgraph.

17. The one or more computer-readable storage media of claim 15, further comprising:

comparing the subgraph with a plurality of subgraphs which are based on a plurality of existing software programs;

based on the comparing of the subgraph with the plurality of subgraphs, identifying occurrences, in the plurality of existing software programs, of a code pattern that corresponds to the subgraph; and performing debugging operations with relation to the source code, based on the identifying of the occurrences.

18. A system comprising:

one or more processors; and one or more computer-readable storage media communicatively coupled to the one or more processors and storing instructions thereon that, in response to execution by the one or more processors, cause the system to perform operations comprising:

obtaining an abstract syntax tree (AST) that represents constructs of source code and relationships between the constructs in the source code, the abstract syntax tree comprising:

a first AST node that represents a first construct as recited at a first location in the source code; and a second AST node that represents a second construct as recited at a second location in the source code, the first AST node being connected to the second AST node in the abstract syntax tree in a manner that represents a relationship between the first construct at the first location and the second construct at the second location; and generating an abstract code graph (ACG), based on the abstract syntax tree, the generating of the abstract code graph comprising:

generating a first ACG node based on the first AST node, the first ACG node representing the first construct at a first level of abstraction that corresponds to the first construct as recited in the source code at the first location;

generating a second ACG node based on the second AST node;

identifying a category descriptive of a characteristic of the first construct, the category also being descriptive of the characteristic with respect to other constructs; and generating, based on the first ACG node, a third ACG node that represents the first construct at a second level of abstraction that corresponds to the category in general, the third ACG node being connected between the first ACG node and the second ACG node the second ACG node being related to the first ACG node through the third ACG node in the abstract code graph, the relation between the first ACG node and the second ACG node being based on the first AST node being connected to the second AST node in the abstract syntax tree.

19. The system of claim 18, wherein:
the first AST node represents the first construct at a first level of abstraction;
the abstract syntax tree further includes a third AST node that represents the first construct as recited at a third location in the source code, the third AST node representing the first construct at the first level of abstraction; and
generating the first ACG node based on the first AST node comprises merging the first AST node and the third AST node into the first ACG node in response to the first AST node and the third AST node both representing the first construct at the first level of abstraction.

20. The system of claim 18, wherein:
the abstract syntax tree further includes a third AST node that represents a third construct as recited at a third location in the source code;
the abstract syntax tree further includes a fourth AST node that represents the first construct as recited at a fourth location in the source code, the third AST node being connected to the fourth AST node in the abstract syntax tree in a manner that represents a relationship between the third construct at the third location and the first construct at the fourth location; and
generating the abstract code graph further comprises:
  generating a fourth ACG node based on the fourth AST node, the fourth ACG node representing the first construct at the first level of abstraction;
  generating a fifth ACG node based on the third AST node;
  generating, based on the fourth ACG node, a sixth ACG node that represents the first construct at the second level of abstraction, the sixth ACG node being connected between the fourth ACG node and the fifth ACG node such that the fourth ACG node is related to the fifth ACG node through the sixth ACG node in the abstract code graph, the relation between the fourth ACG node and the fifth ACG node being based on the fourth AST node being connected to the third AST node in the abstract syntax tree;
  merging, in response to both the first ACG node and the fourth ACG node representing the first construct at the first level of abstraction, the first ACG node and the fourth ACG node into a seventh ACG node that represents the first construct at the first level of abstraction; and
  merging, in response to both the third ACG node and the sixth ACG node representing the first construct at the second level of abstraction, the third ACG node and the sixth ACG node into an eighth ACG node that represents the first construct at the second level of abstraction.

\* \* \* \* \*